(12) United States Patent
Schindler

(10) Patent No.: US 7,131,218 B2
(45) Date of Patent: Nov. 7, 2006

(54) FLUID-FILLED BLADDER INCORPORATING A FOAM TENSILE MEMBER

(75) Inventor: Eric Steven Schindler, Portland, OR (US)

(73) Assignee: Nike, Inc., Beaverton, OR (US)

( * ) Notice: Subject to any disclaimer, the term of this patent is extended or adjusted under 35 U.S.C. 154(b) by 177 days.

(21) Appl. No.: 10/783,028

(22) Filed: Feb. 23, 2004

(65) Prior Publication Data

US 2005/0183287 A1    Aug. 25, 2005

(51) Int. Cl.
    *A43B 13/18* (2006.01)
(52) U.S. Cl. ............................. 36/29; 36/35 R; 36/35 B
(58) Field of Classification Search .................. 36/28, 36/29, 35 R, 35 B, 72
    See application file for complete search history.

(56) References Cited

U.S. PATENT DOCUMENTS

| | | | |
|---|---|---|---|
| 3,253,355 A | 5/1966 | Menken | |
| 3,984,926 A * | 10/1976 | Calderon | 36/37 |
| 4,025,974 A | 5/1977 | Lea et al. | |
| 4,138,156 A | 2/1979 | Bonner | |
| 4,219,945 A | 9/1980 | Rudy | |
| 4,513,449 A | 4/1985 | Donzis | |
| 4,619,055 A * | 10/1986 | Davidson | 36/28 |
| 4,874,640 A | 10/1989 | Donzis | |
| 4,906,502 A | 3/1990 | Rudy | |
| 5,083,361 A | 1/1992 | Rudy | |
| 5,092,060 A * | 3/1992 | Frachey et al. | 36/29 |
| 5,134,790 A * | 8/1992 | Woitschaetzke et al. | 36/28 |
| 5,369,896 A * | 12/1994 | Frachey et al. | 36/29 |
| 5,543,194 A | 8/1996 | Rudy | |
| 5,630,237 A | 5/1997 | Ku | |
| 5,741,568 A | 4/1998 | Rudy | |
| 5,918,383 A * | 7/1999 | Chee | 36/28 |
| 5,987,781 A * | 11/1999 | Pavesi et al. | 36/29 |
| 5,993,585 A | 11/1999 | Goodwin et al. | |
| 5,996,253 A * | 12/1999 | Spector | 36/27 |
| 6,041,521 A | 3/2000 | Wong | |
| 6,119,371 A | 9/2000 | Goodwin et al. | |
| 6,127,010 A | 10/2000 | Rudy | |
| 2005/0039346 A1* | 2/2005 | Thomas et al. | 36/29 |
| 2005/0097777 A1* | 5/2005 | Goodwin | 36/29 |

FOREIGN PATENT DOCUMENTS

| | | |
|---|---|---|
| EP | 0 399 332 | 11/1990 |
| EP | 0 884 006 | 12/1998 |
| FR | 2814342 | 3/2002 |
| WO | WO 96/02169 | 2/1996 |

OTHER PUBLICATIONS

"MuCell™ Microcellular Injection Molding Processing Technology" 6 pages, MuCell Processes Trexel Inc.
"smartLite® 304" Oct. 17, 2002, 2 pages, Huntsman (Europe) BVBA.

* cited by examiner

*Primary Examiner*—Marie Patterson
(74) *Attorney, Agent, or Firm*—Banner & Witcoff, Ltd

(57) ABSTRACT

A fluid-filled bladder is disclosed that may be incorporated into footwear or other products. The bladder includes a sealed outer barrier, a foam tensile member, and a fluid. The tensile member is located within the barrier and bonded to opposite sides of the barrier. The fluid is also located within the barrier, and the fluid is pressurized to place an outward force upon the barrier and induce tension in the tensile member.

55 Claims, 23 Drawing Sheets

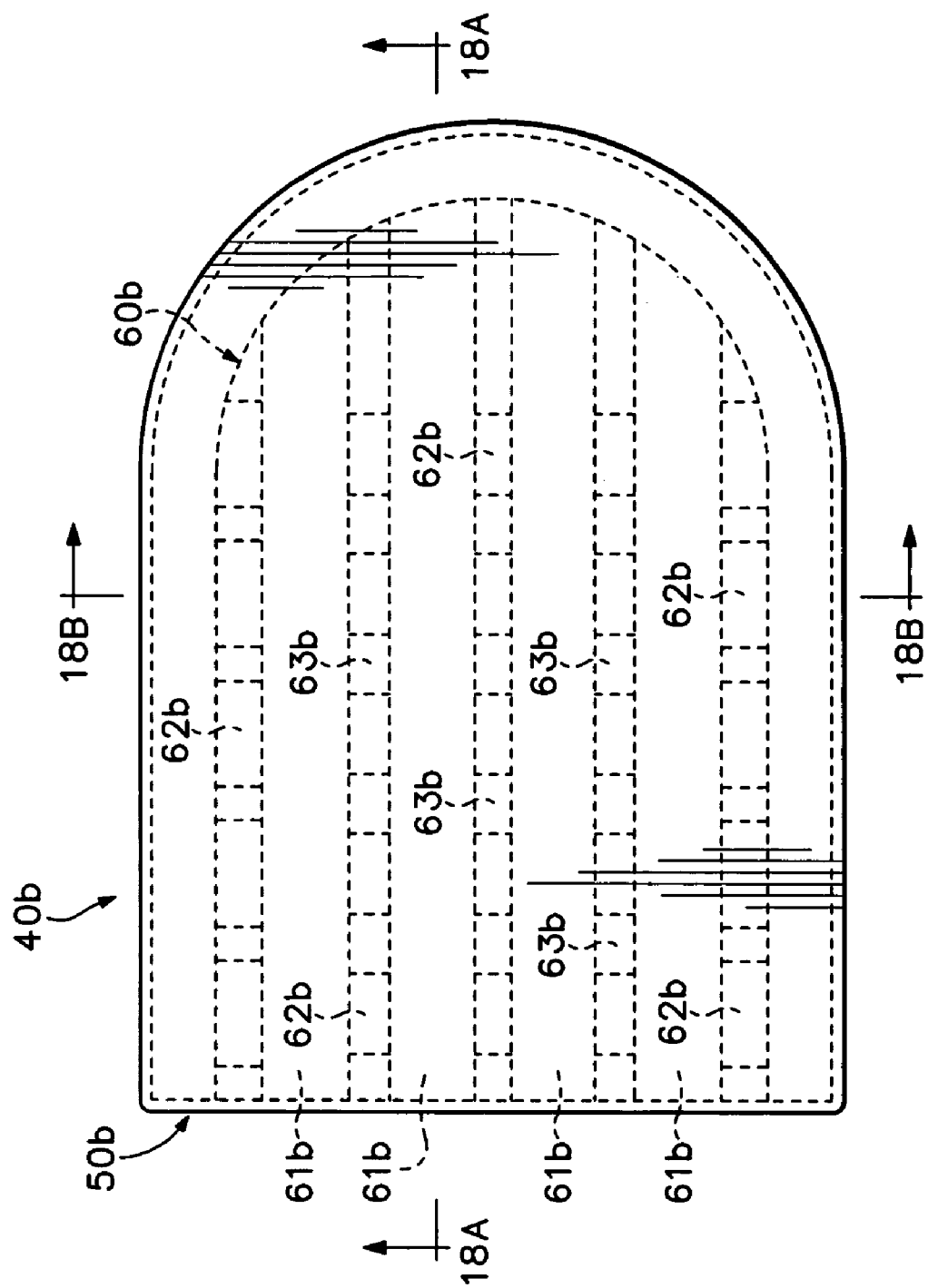

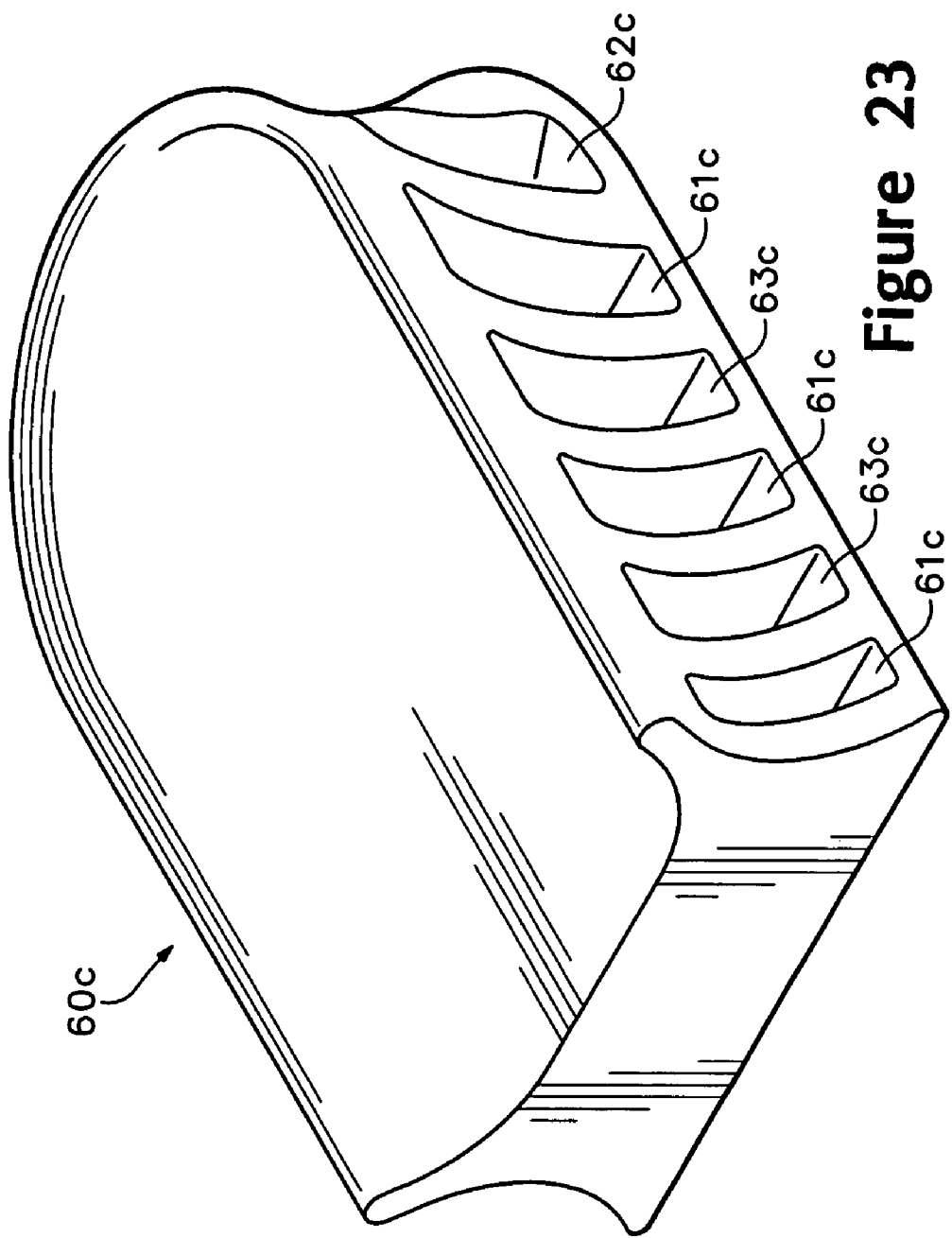

FLUID-FILLED BLADDER INCORPORATING A FOAM TENSILE MEMBER

BACKGROUND OF THE INVENTION

1. Field of the Invention

The present invention relates to fluid-filled bladders that may be incorporated into footwear or a variety of other products. The fluid-filled bladders may include, for example, a barrier that encloses a foam tensile member.

2. Description of Background Art

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and is generally positioned between the foot and the ground. In addition to attenuating ground reaction forces and absorbing energy (i.e., imparting cushioning), the sole structure may provide traction and control potentially harmful foot motion, such as over pronation. Accordingly, the upper and the sole structure operate cooperatively to provide a comfortable structure that is suited for a wide variety of ambulatory activities, such as walking and running. The general features and configuration of the upper and the sole structure are discussed in greater detail below.

The sole structure of athletic footwear generally exhibits a layered structure that includes a comfort-enhancing insole, a resilient midsole formed from a polymer foam, and a ground-contacting outsole that provides both abrasion-resistance and traction. Suitable polymer foam materials for the midsole include ethylvinylacetate or polyurethane that compress resiliently under an applied load to attenuate ground reaction forces and absorb energy. Conventional foam materials are resiliently compressible, in part, due to the inclusion of a plurality of open or closed cells that define an inner volume substantially displaced by gas. That is, the foam includes bubbles formed in the material that enclose the gas. Following repeated compressions, however, the cell structure may deteriorate, thereby resulting in decreased compressibility of the foam. Thus, the force attenuation and energy absorption characteristics of the midsole may decrease over the lifespan of the footwear.

One way to overcome the drawbacks of utilizing conventional foam materials is disclosed in U.S. Pat. No. 4,183,156 to Rudy, hereby incorporated by reference, in which cushioning is provided by inflatable inserts formed of elastomeric materials. The inserts include a plurality of tubular chambers that extend substantially longitudinally throughout the length of the footwear. The chambers are in fluid communication with each other and jointly extend across the width of the footwear. U.S. Pat. No. 4,219,945 to Rudy, hereby incorporated by reference, discloses an inflated insert encapsulated in a foam material. The combination of the insert and the encapsulating material functions as a midsole. An upper is attached to the upper surface of the encapsulating material and an outsole or tread member is affixed to the lower surface.

Such bladders are generally formed of an elastomeric material and are structured to have an upper or lower surface that encloses one or more chambers therebetween. The chambers are pressurized above ambient pressure by inserting a nozzle or needle connected to a fluid pressure source into a fill inlet formed in the bladder. After the chambers are pressurized, the fill inlet is sealed, for example, by welding, and the nozzle is removed.

Bladders of this type have been manufactured by a two-film technique, in which two separate sheets of elastomeric film are formed to exhibit the overall peripheral shape of the bladder. The sheets are then welded together along their respective peripheries to form a sealed structure, and the sheets are also welded together at predetermined interior areas to give the bladder a desired configuration. That is, the interior welds provide the bladder with chambers having a predetermined shape and size at desired locations. Such bladders have also been manufactured by a blow-molding technique, wherein a liquefied elastomeric material is placed in a mold having the desired overall shape and configuration of the bladder. The mold has an opening at one location through which pressurized air is provided. The pressurized air forces the liquefied elastomeric material against the inner surfaces of the mold and causes the material to harden in the mold, thereby forming a bladder with the desired shape and configuration.

Another type of prior art bladder suitable for footwear applications is disclosed in U.S. Pat. Nos. 4,906,502 and 5,083,361, both to Rudy, and both hereby incorporated by reference. This type of bladder is formed as a fluid pressurized and inflated structure that comprises a hermetically sealed outer barrier layer which is securely fused substantially over the entire outer surfaces of a tensile member having the configuration of a double-walled fabric core. The tensile member is comprised of first and second outer fabric layers that are normally spaced apart from one another at a predetermined distance. Connecting or drop yarns, potentially in the form of multi-filament yarns having many individual fibers, extend internally between the proximal or facing surfaces of the respective fabric layers. The filaments of the drop yarns form tensile restraining means and are anchored to the respective fabric layers. A suitable method of manufacturing the double walled fabric structure is double needle bar raschel knitting.

U.S. Pat. Nos. 5,993,585 and 6,119,371, both issued to Goodwin et al., and both hereby incorporated by reference, disclose a bladder utilizing a tensile member, but without a peripheral seam located midway between the upper and lower surfaces of the bladder. Instead, the seam is located adjacent to the upper surface of the bladder. Advantages in this design include removal of the seam from the area of maximum sidewall flexing and increased visibility of the interior of the bladder, including the connecting yarns. The process utilized to form a bladder of this type involves the formation of a shell, which includes a lower surface and a sidewall, with a mold. A tensile member is placed on top of a covering sheet, and the shell, following removal from the mold, is placed over the covering sheet and tensile member. The assembled shell, covering sheet, and tensile member are then moved to a lamination station where radio frequency energy fuses opposite sides of the tensile member to the shell and covering sheet and fuses a periphery of the shell to the covering sheet. The bladder is then pressurized by inserting a fluid so as to place the connecting yarns in tension.

While the cushioning benefits of bladders in articles of footwear are well documented, the prior art methods of producing bladders utilizing a double-walled fabric core have made them costly and time consuming to manufacture. For example, the double-walled fabric core is typically secured within the bladder by attaching a layer of thermally activated fusing agent to the outer surfaces of the core, and then heating the bladder components to cause the fusing agent to melt, thereby securing the core the outer layers of the bladder. In practice, it is time consuming to add the fusing agent to the outer surfaces of the core and requires additional manufacturing steps, thereby increasing overall cost. Accordingly, the art requires a simple, more cost-effective bladder with a tensile member. In addition to other benefits that will become apparent from the following disclosure, the present invention fulfills this need.

SUMMARY OF THE INVENTION

The present invention is a bladder that includes a sealed outer barrier, a foam tensile member, and a fluid. The tensile member is located within the barrier and bonded to opposite sides of the barrier. The fluid is also located within the barrier, and the fluid is pressurized to place an outward force upon the barrier and induce tension in the tensile member. The bladder may be incorporated into an article of footwear, for example, and may form a portion of a sole structure of the footwear. In addition, the bladder may be incorporated into a variety of other products.

In another aspect of the invention, an article of footwear includes an upper and a sole structure. The upper defines an interior void for receiving a foot, and the sole structure is secured to the upper. The sole structure incorporates a bladder that forms at least a portion of a midsole, and the bladder includes a barrier, a tensile member, and a fluid (e.g., a gas, liquid, or gel). The barrier is sealed and formed of a thermoplastic polymer sheet material, and the barrier defines an interior volume. The tensile member is formed of a thermoplastic polymer foam material, and the tensile member is located within the interior volume and bonded to opposite sides of the barrier. The fluid is located within the interior volume. At least a portion of the fluid is separate from the tensile member, and the fluid is pressurized to place an outward force upon the barrier and induce tension in the tensile member.

A further aspect of the invention is a method of manufacturing a component for an article of footwear. The method includes a step of forming a barrier that defines an interior volume. A foam member is positioned within the interior volume and directly bonded to opposite sides of the barrier. In addition, the interior volume is pressurized to place an outward force upon the barrier and induce tension in the foam member.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 17 is a top plan view of the third bladder.

FIG. 23 is a perspective view of a tensile member portion of the fourth bladder.

DETAILED DESCRIPTION OF THE INVENTION

The following discussion and accompanying figures disclose various articles of athletic footwear incorporating a fluid-filled bladder in accordance with the present invention. Concepts related to the footwear, and more particularly the fluid-filled bladders, are disclosed with reference to footwear having a configuration that is suitable for running. The invention is not solely limited to footwear designed for running, however, and may be applied to a wide range of athletic footwear styles, including basketball shoes, cross-training shoes, walking shoes, tennis shoes, soccer shoes, and hiking boots, for example. In addition, the invention may also be applied to footwear styles that are generally considered to be non-athletic, including dress shoes, loafers, sandals, and work boots. Accordingly, one skilled in the relevant art will recognize that the concepts disclosed herein apply to a wide variety of footwear styles, in addition to the specific style discussed in the following material and depicted in the accompanying figures.

In addition to footwear, the fluid-filled bladder may be incorporated into a variety of other products, including straps for carrying backpacks and golf bags, cushioning pads for football or hockey, or bicycle seats, for example. Although the fluid-filled bladder is suited for various types of athletic products, the fluid-filled bladder may also be incorporated into various non-athletic products, such as inflatable mattresses and pressure-sensing seat cushions, for example. Accordingly, the various fluid-filled bladders disclosed below with respect to footwear may be used in connection with a variety of products.

Figure 1:
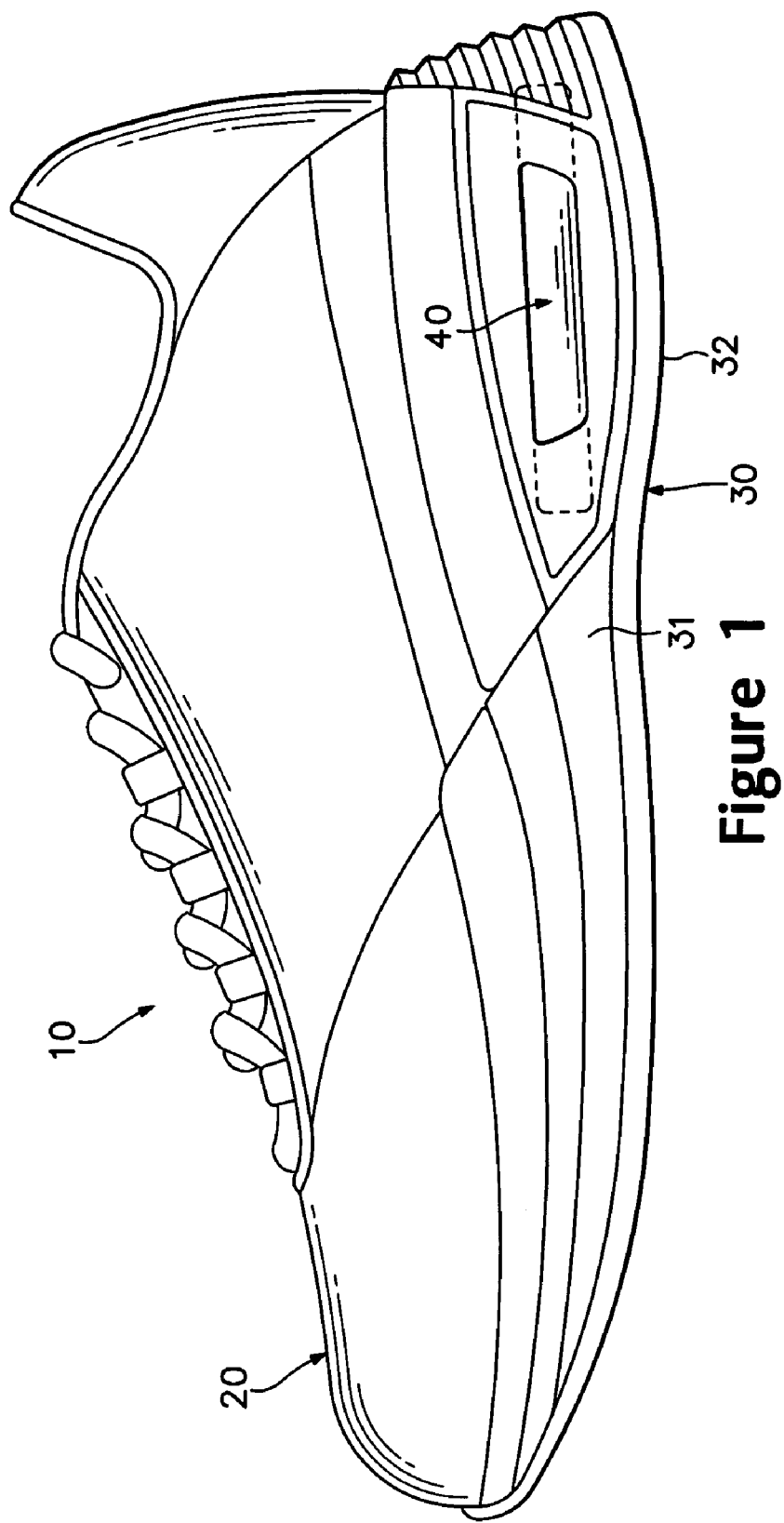
FIG. 1 is a lateral elevational view of an article of footwear incorporating a first bladder in accordance with the present invention.
Figure 2:
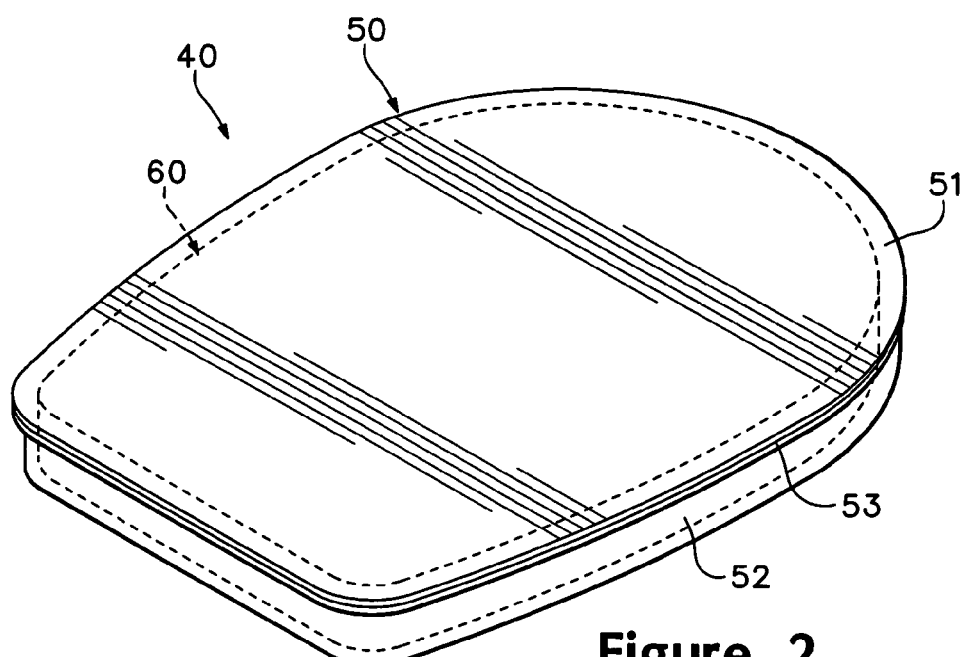
FIG. 2 is a perspective view of the first bladder.
Figure 3:
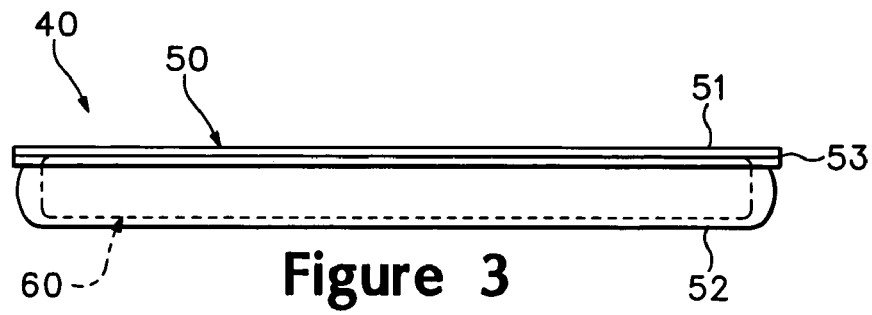
FIG. 3 is a side elevational view of the first bladder.
Figure 4:
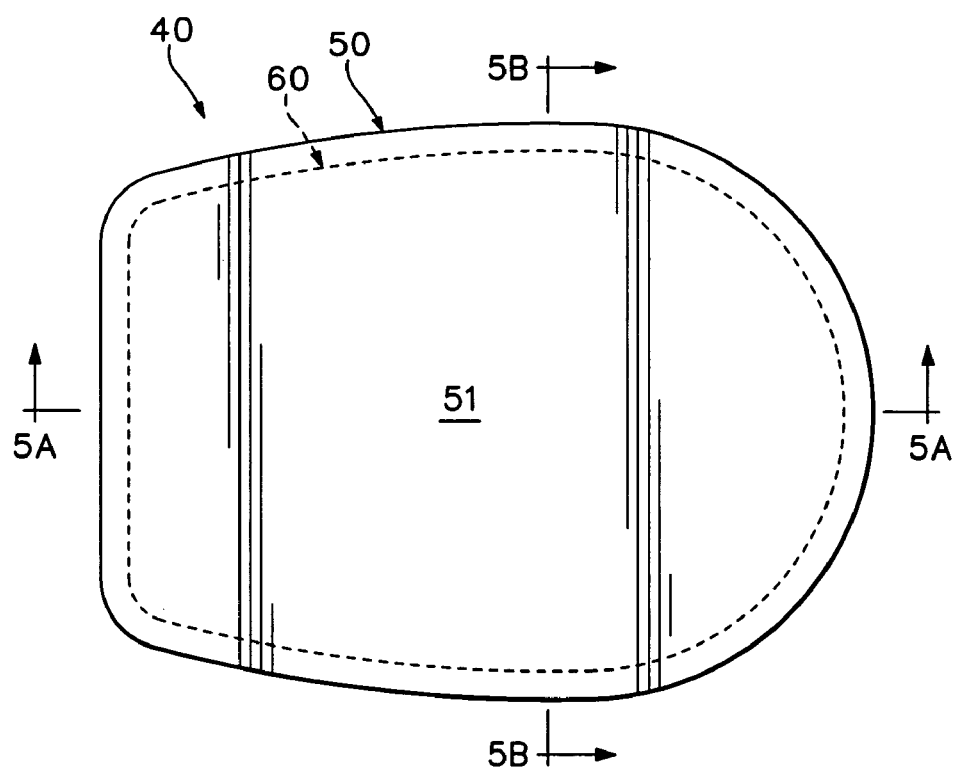
FIG. 4 is a top plan view of the first bladder.
Figure 5A:
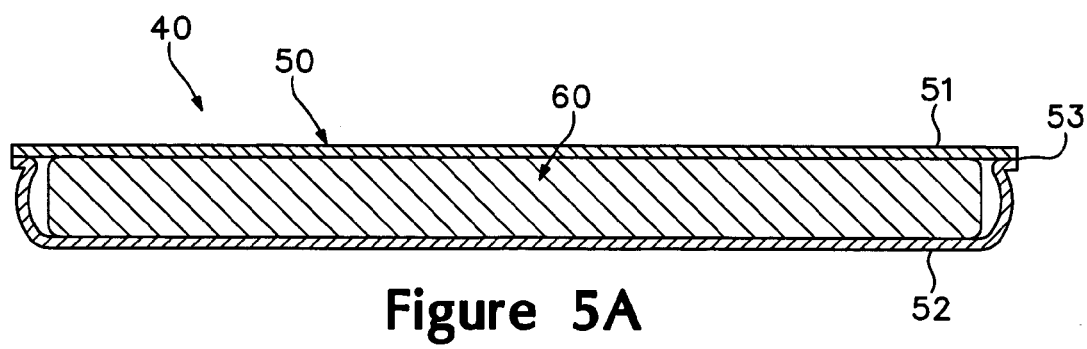
FIG. 5A is a first cross-sectional view of the first bladder, as defined along section line 5A—5A in FIG. 4.
Figure 5B:
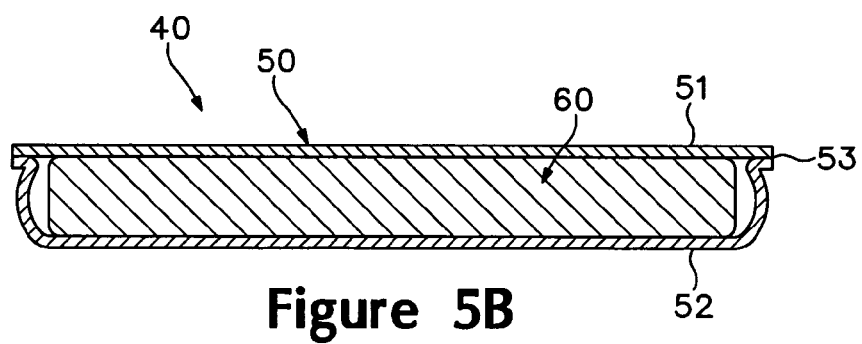
FIG. 5B is a second cross-sectional view of the first bladder, as defined along section line 5B—5B in FIG. 4.
Figure 6:
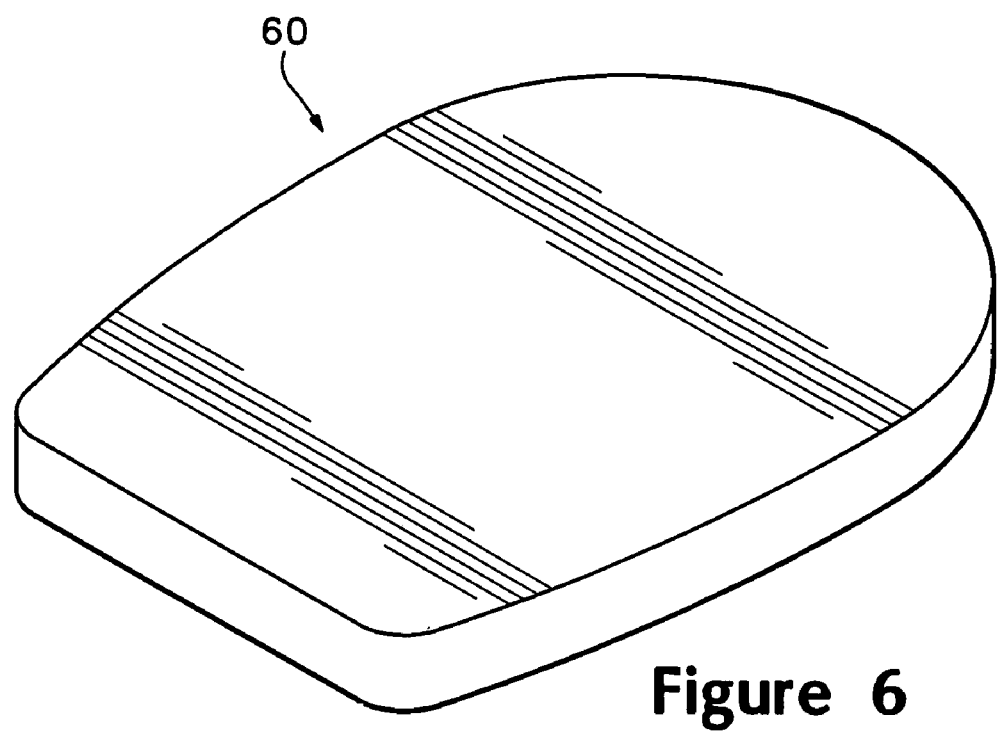
FIG. 6 is a perspective view of a tensile member portion of the first bladder.
Figure 7:
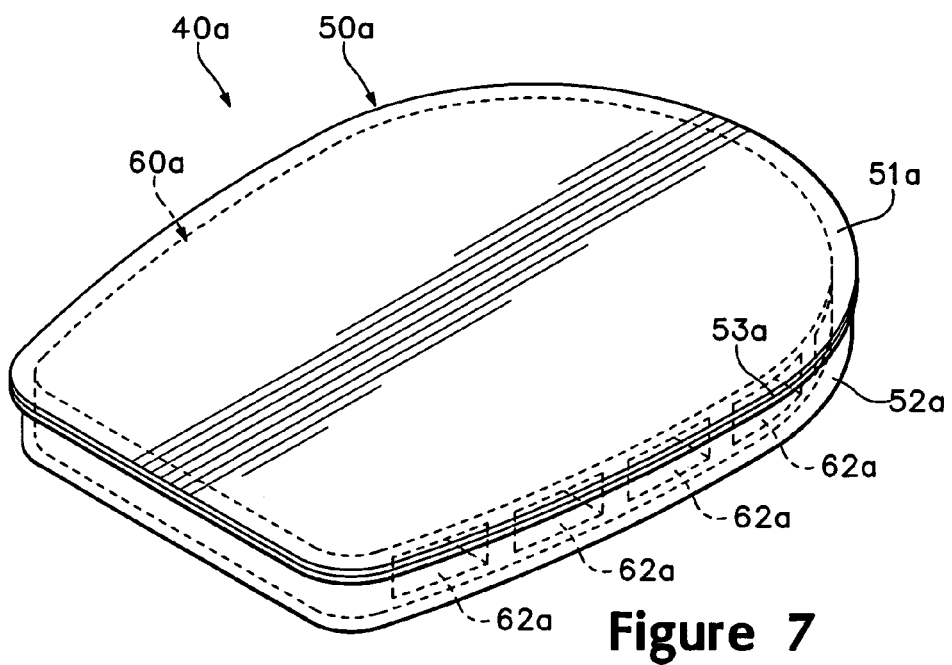
FIG. 7 is a perspective view of a second bladder in accordance with the present invention.
Figure 8:
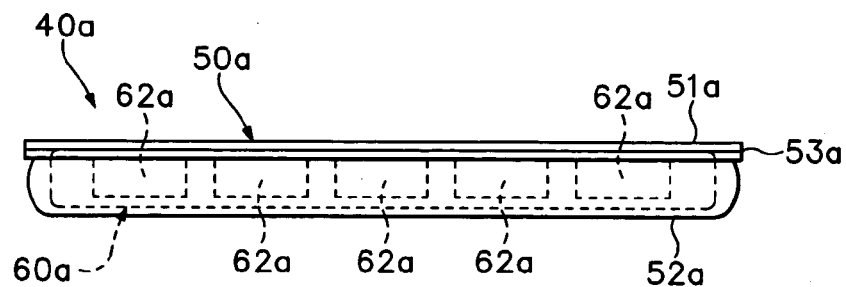
FIG. 8 is a side elevational view of the second bladder.
Figure 9:
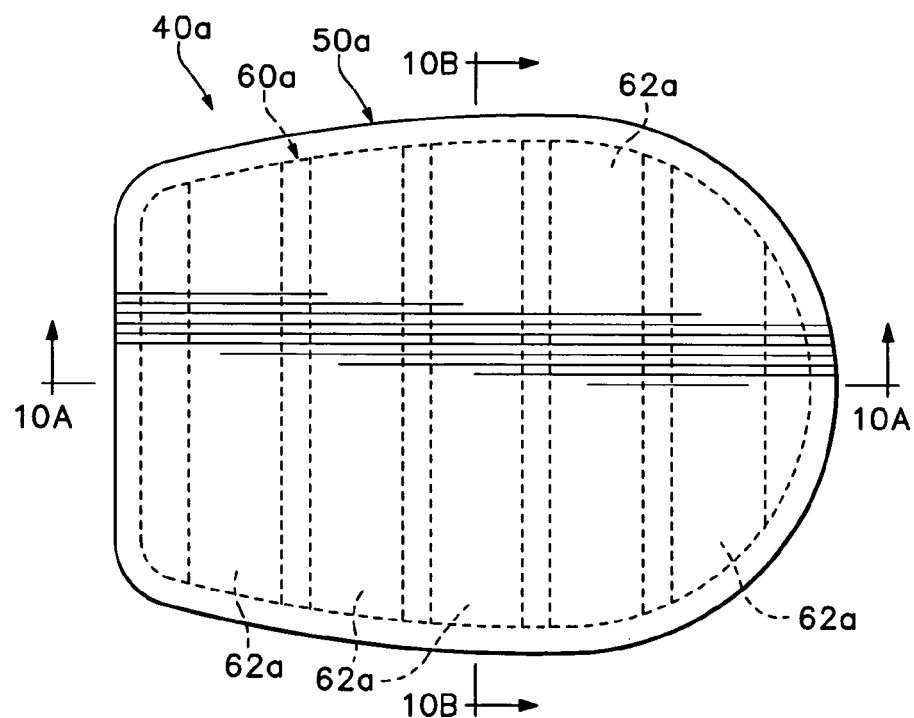
FIG. 9 is a top plan view of the second bladder.
Figure 10A:
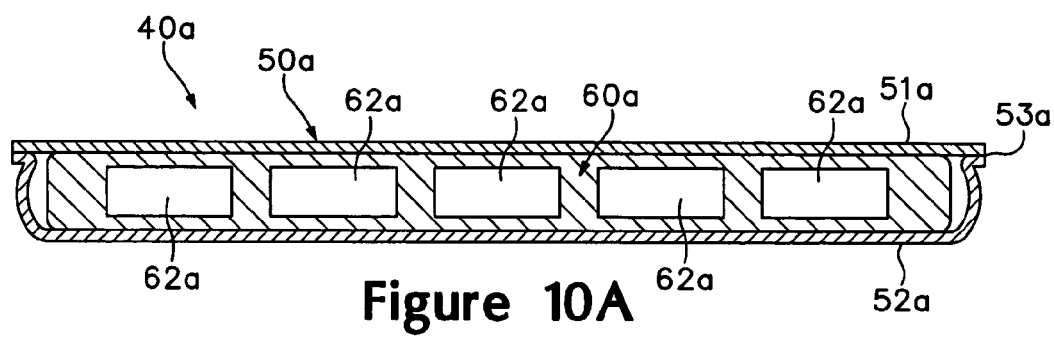
FIG. 10A is a first cross-sectional view of the second bladder, as defined along section line 10A—10A in FIG. 9.
Figure 10B:
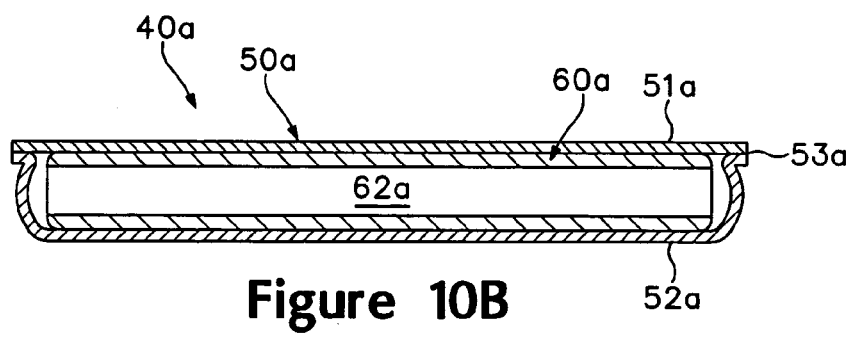
FIG. 10B is a second cross-sectional view of the second bladder, as defined along section line 10B—10B in FIG. 9.
Figure 11:
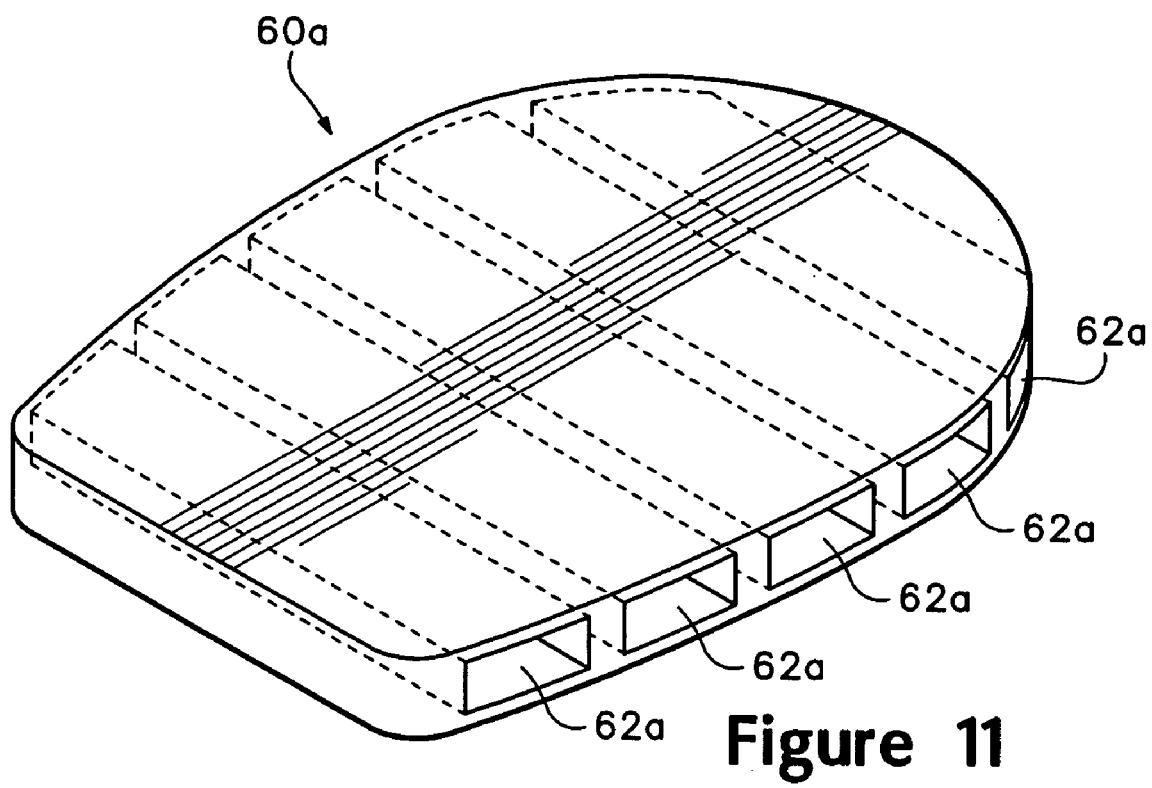
FIG. 11 is a perspective view of a tensile member portion of the second bladder.

An article of footwear 10 is depicted in FIG. 1 and includes an upper 20 and a sole structure 30. Upper 20 has a substantially conventional configuration and includes a plurality elements, such as textiles, foam, and leather materials, that are stitched or adhesively bonded together to form an interior void for securely and comfortably receiving the foot. Sole structure 30 is positioned below upper 20 and includes two primary elements, a midsole 31 and an outsole 32. Midsole 31 is secured to a lower surface of upper 20, through stitching or adhesive bonding for example, and operates to attenuate forces and absorb energy as sole structure 30 impacts the ground. That is, midsole 31 is structured to provide the foot with cushioning during walking or running, for example. Outsole 32 is secured to a lower surface of midsole 31 and is formed of a durable, wear-resistant material that is suitable for engaging the ground. In addition, sole structure 30 may include an insole (not depicted), which is a thin cushioning member, located within the void and adjacent to the plantar surface of the foot to enhance the comfort of footwear 10.

Midsole 31 is primarily formed of a polymer foam material, such as polyurethane or ethylvinylacetate, that encapsulates a fluid-filled bladder 40. As depicted in FIG. 1, bladder 40 is positioned in a heel region of midsole 31, but may be positioned in any region of midsole 31 to obtain a desired degree of cushioning response. Furthermore, midsole 31 may encapsulate multiple fluid-filled bladders having the general configuration of bladder 40. Bladder 40 may be only partially encapsulated within midsole 31 or entirely encapsulated within midsole 31. For example, portions of bladder 40 may protrude outward from a side surface of midsole 31, or an upper surface of bladder 40 may coincide with an upper surface of midsole 31. Alternately, midsole 31 may extend over and entirely around bladder 40. Accordingly, the position of bladder 40 with respect to footwear 10 may vary significantly within the scope of the present invention.

The primary elements of bladder 40, as depicted in FIGS. 2–6, are an outer barrier 50 and a tensile member 60. Barrier 50 includes a first barrier layer 51 and a second barrier layer 52 that are substantially impermeable to a pressurized fluid contained by bladder 40. The pressurized fluid will, therefore, generally remain sealed within bladder 40 for a duration that includes the expected life of footwear 10. First barrier layer 51 and second barrier layer 52 are bonded together around their respective peripheries to form a peripheral bond 53 and cooperatively form a sealed chamber, in which tensile member 60 and the pressurized fluid are located.

Tensile member 60 is a foam element that is bonded to each of first barrier layer 51 and second barrier layer 52. The upper and lower surface of tensile member 60 are generally planar and parallel, and tensile member 60 is depicted as having a continuous configuration that does not include any apertures or other discontinuities. In further embodiments of the invention, the upper and lower surface of tensile member 60 may be non-planar and non-parallel, and various apertures may extend through or partially through tensile member 60. In addition, the density or compressibility of the material forming various portions of tensile member 60 may vary. For example, the portion of tensile member 60 located in a lateral area of footwear 10 may exhibit a different density than the portion of tensile member 60 located in a medial area of footwear 10 in order to limit the degree of pronation in the foot during running.

The pressurized fluid contained by bladder 40 induces an outward force upon barrier 50 and tends to separate or otherwise press outward upon first barrier layer 51 and second barrier layer 52. In the absence of tensile member 60, the outward force induced by the pressurized fluid would impart a rounded or otherwise bulging configuration to bladder 40. Tensile member 60, however, is bonded to each of first barrier layer 51 and second barrier layer 52 and restrains the separation of first barrier layer 51 and second barrier layer 52. Accordingly, tensile member 60 is placed in tension by the fluid and retains the generally flat configuration of bladder 40 that is depicted in the figures.

As discussed above, tensile member 60 is bonded to each of first barrier layer 51 and second barrier layer 52. A variety of bonding methods may be employed to secure barrier 50 and tensile member 60 together, and the bonding methods may be at least partially determined by the materials selected for each of barrier 50 and tensile member 60. For example, an adhesive may be utilized to bond the components when barrier 50 is formed from a thermoplastic polymer material and tensile member 60 is formed from a thermoset polymer material. When at least one of barrier 50 and tensile member 60 are formed from a thermoplastic polymer material, however, direct bonding may be an effective manner of securing barrier 50 and tensile member 60.

As utilized within the present application, the term "direct bond", or variants thereof, is defined as a securing technique between barrier 50 and tensile member 60 that involves a melting or softening of at least one of barrier 50 and tensile member 60 such that the materials of barrier 50 and tensile member 60 are secured to each other when cooled. In general, the direct bond may involve the melting or softening of both barrier 50 and tensile member 60 such that the materials diffuse across a boundary layer between barrier 50 and tensile member 60 and are secured together when cooled. The direct bond may also involve the melting or softening of only one of barrier 50 and tensile member 60 such that the molten material extends into crevices or cavities formed by the other material to thereby secure the components together when cooled. Accordingly, a direct bond between barrier 50 and tensile member 60 does not generally involve the use of adhesives. Rather, barrier 50 and tensile member 60 are directly bonded to each other.

A variety of thermoplastic polymer materials may be utilized for barrier 50, including polyurethane, polyester, polyester polyurethane, and polyether polyurethane. Another suitable material for barrier 50 is a film formed from alternating layers of thermoplastic polyurethane and ethylene-vinyl alcohol copolymer, as disclosed in U.S. Pat. Nos. 5,713,141 and 5,952,065 to Mitchell et al, hereby incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized. Barrier 50 may also be formed from a flexible microlayer membrane that includes alternating layers of a gas barrier material and an elastomeric material, as disclosed in U.S. Pat. Nos. 6,082,025 and 6,127,026 to Bonk et al., both hereby incorporated by reference. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Additional suitable materials are disclosed in U.S. Pat. Nos. 4,183,156 and 4,219,945 to Rudy, hereby incorporated by reference. Further suitable materials include thermoplastic films containing a crystalline material, as disclosed in U.S. Pat. Nos. 4,936,029 and 5,042,176 to Rudy, hereby incorporated by reference, and polyurethane including a polyester polyol, as disclosed in U.S. Pat. Nos. 6,013,340; 6,203,868; and 6,321,465 to Bonk et al., also hereby incorporated by reference.

Both thermoplastic and thermoset polymer materials may be utilized for barrier 50. An advantage of utilizing a thermoplastic polymer material over a thermoset polymer material for barrier 50 is that first barrier layer 51 and second barrier layer 52 may be bonded together through the application of heat at the position of peripheral bond 53. In addition, first barrier layer 51 and second barrier layer 52 may be heated and stretched to conform to the desired shape of barrier 50. Whereas first barrier layer 51 forms the upper surface of bladder 40, second barrier layer 52 forms both the lower surface and a majority of a sidewall of bladder 40. This configuration positions peripheral bond 53 adjacent to the upper surface and promotes visibility through the sidewall. Alternately, peripheral bond 53 may be positioned adjacent to the lower surface or at a location that is between the upper surface and the lower surface. Peripheral bond 53 may, therefore, extend through the sidewall such that both first barrier layer 51 and second barrier layer 52 form substantially equal portions of the sidewall. Accordingly, the specific configuration of barrier 50 and the position of peripheral bond 53 may vary significantly within the scope of the present invention.

A variety of foam materials are suitable for tensile member 60. Thermoset polymer foams, including polyurethane and ethylvinylacetate, may be utilized with an adhesive or when the direct bond involves the melting or softening of barrier 50 such that the molten material extends into cavities formed by the foamed cells of tensile member 60. When both barrier 50 and tensile member 60 are formed of a thermoplastic polymer foam, the materials forming both components may be melted or softened such that the materials diffuse across a boundary layer between barrier 50 and tensile member 60 and are secured together upon cooling. Direct bonding may, therefore, occur between barrier 50 and tensile member 60 whether tensile member 60 is formed from a thermoset or thermoplastic polymer foam. Thermoplastic polymer foams also exhibit an advantage of having greater tear and shear properties than thermoset polymer foams, and thermoplastic polymer foams are reusable or recyclable.

With regard to thermoplastic polymer foams, one suitable material is manufactured by Huntsman International, L.L.C. under the SMARTLITE trademark. A suitable version of this thermoplastic polyurethane foam exhibits a density of 0.65 grams per cubic centimeter and a hardness of 57 on the Shore A scale. In further embodiments of the invention, a thermoplastic polyurethane foam exhibiting a density of 0.50 grams per cubic centimeter and a hardness of 85 on the Shore A scale may be utilized. Accordingly, the density and hardness of suitable polymer foams may vary significantly within the scope of the present invention. Another suitable material is produced through a process developed by Trexel, Incorporated and marketed under the MUCELL trademark. The process involves injecting a supercritical fluid, such as carbondioxide or nitrogen, into a thermoplastic polyurethane. A large number of nucleation sites are then formed in the thermoplastic polyurethane through a substantial and rapid pressure drop. The controlled growth of cells is achieved through monitoring of the pressure and temperature following the pressure drop, and the thermoplastic polyurethane is injected into a mold to form tensile member 60.

The fluid contained by bladder 40 may be any of the gasses disclosed in U.S. Pat. No. 4,340,626 to Rudy, hereby incorporated by reference, such as hexafluoroethane and sulfur hexafluoride, for example. In addition, the fluid may include pressurized octafluorapropane, nitrogen, and air. The pressure of the fluid may range from a gauge pressure of zero to fifty pounds per square inch, for example.

With reference to FIG. 1, bladder 40 is at least partially encapsulated by the polymer foam material of midsole 31. During walking, running, or other ambulatory activities, midsole 31 and bladder 40 are compressed between the heel of the foot and the ground, thereby attenuating ground reaction forces and absorbing energy (i.e., imparting cushioning). As discussed above, tensile member 60 is bonded to each of first barrier layer 51 and second barrier layer 52 and is placed in tension by the pressurized fluid. As bladder 40 is compressed between the heel and the foot, therefore, bladder 40 is compressed and the tension in tensile member 60 is relieved. Upon removal of the compressive force caused by the foot and the ground, the outward force induced by the fluid returns the tension in tensile member 60.

A bladder 40a is depicted in FIGS. 7–11 and has the general configuration of bladder 40, as discussed above. Accordingly, bladder 40a includes an outer barrier 50a and a tensile member 60a. Barrier 50a includes a first barrier layer 51a and a second barrier layer 52a that are substantially impermeable to a pressurized fluid contained by bladder 40a. First barrier layer 51a and second barrier layer 52a are bonded together around their respective peripheries to form a peripheral bond 53a and cooperatively form a sealed chamber, in which tensile member 60a and the pressurized fluid are located.

Tensile member 60a is a foam member that is bonded to each of first barrier layer 51a and second barrier layer 52a. The upper and lower surface of tensile member 60a are generally planar and parallel. In contrast with bladder 40, and more particularly tensile member 60, tensile member 60a defines five channels 62a that extend laterally through tensile member 60a. In further embodiments of the invention, the upper and lower surface of tensile member 60a may be non-planar and non-parallel, and the various channels 62*a* may extend longitudinally or both laterally and longitudinally through tensile member 60*a*.

The pressurized fluid contained by bladder 40*a* induces an outward force upon barrier 50*a* and tends to separate or otherwise press outward upon first barrier layer 51*a* and second barrier layer 52*a*. Tensile member 60*a* is placed in tension by the fluid and retains the generally flat configuration of bladder 40*a* that is depicted in the figures. As with bladder 40, direct bonding may be an effective manner of securing barrier 50*a* and tensile member 60*a*.

Figure 12:
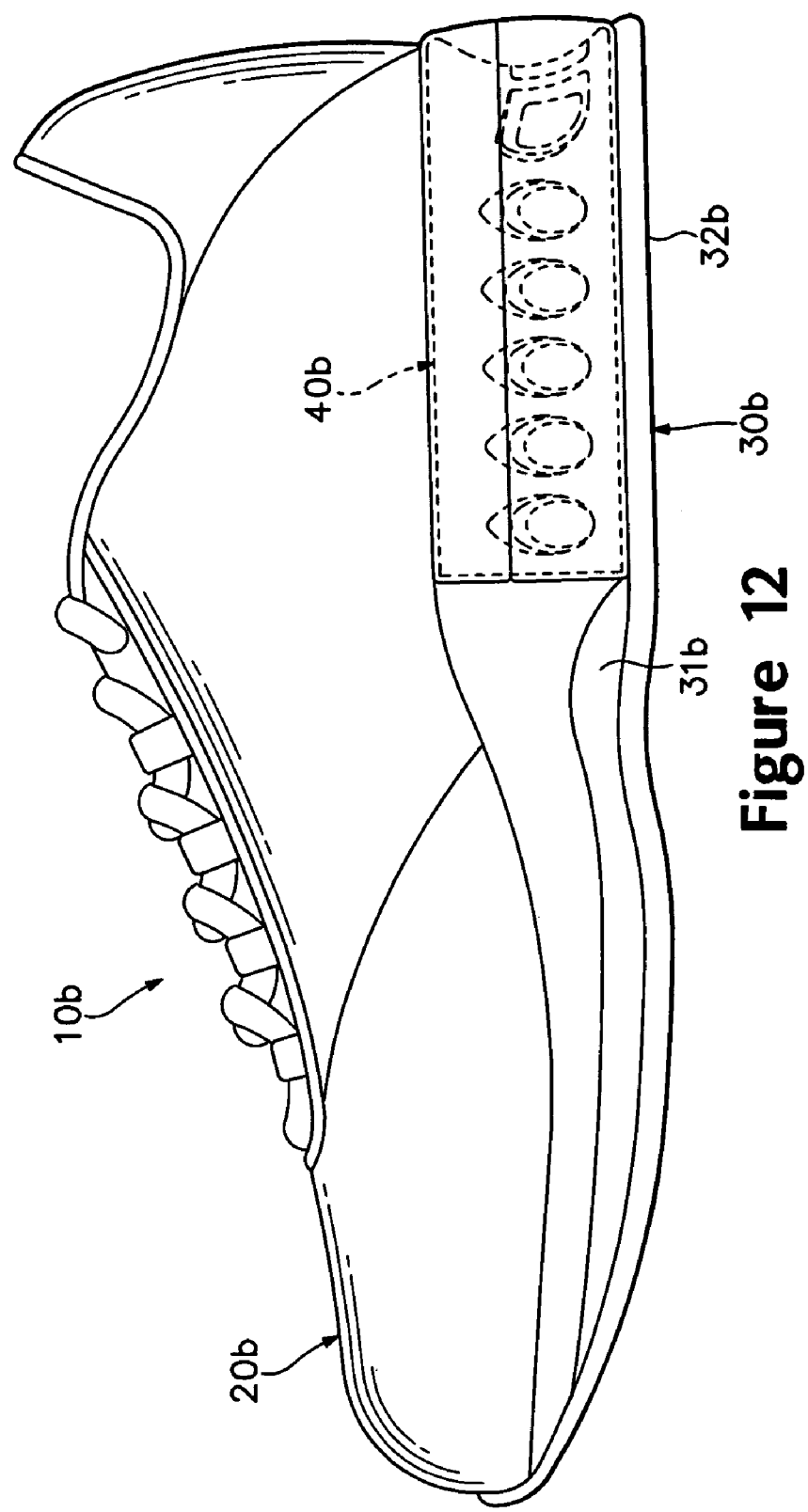
FIG. 12 is a lateral elevational view of an article of footwear incorporating a third bladder in accordance with the present invention.
Figure 13:
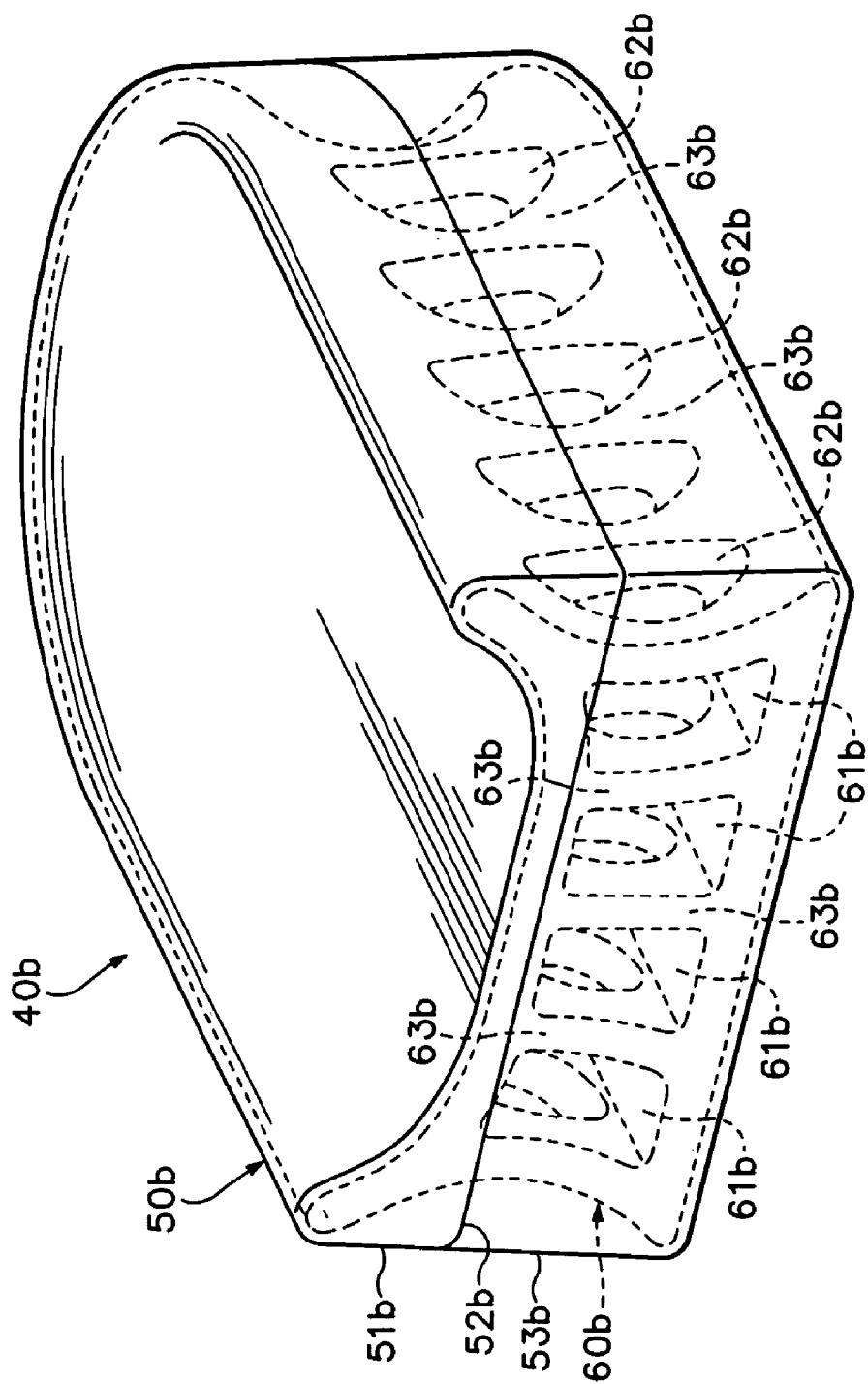
FIG. 13 is a perspective view of the third bladder.

An article of footwear 10*b* is depicted in FIG. 12 and includes an upper 20*b* and a sole structure 30*b*. Upper 20*b* has a substantially conventional configuration and includes a plurality elements, such as textiles, foam, and leather materials, that are stitched or adhesively bonded together to form an interior void for securely and comfortably receiving the foot. Sole structure 30*b* is positioned below upper 20*b* and includes two primary elements, a midsole 31*b* and an outsole 32*b*. Midsole 31*b* is secured to a lower surface of upper 20*b*, through stitching or adhesive bonding for example, and operates to attenuate forces and absorb energy as sole structure 30*b* impacts the ground.

Midsole 31*b* includes a bladder 40*b* that is positioned in a heel region of footwear 10*b*. A first surface of bladder 40*b* is secured to the lower surface of upper 20*b*, and an opposite second surface of bladder 40*b* is secured to outsole 32*b*. In contrast with bladder 40, therefore, bladder 40*b* may be separate from (i.e., not encapsulated by) the polymer foam material that forms other portions of midsole 31*b*. In further configurations, however, bladder 40*b* may be encapsulated within the polymer foam material that forms midsole 31*b*, or bladder 40*b* may extend through the longitudinal length of midsole 31*b* to support the entire length of the foot.

The primary elements of bladder 40*b*, as depicted in FIGS. 13–19, are an outer barrier 50*b* and a tensile member 60*b*. Barrier 50*b* includes a first barrier layer 51*b* and a second barrier layer 52*b* that are substantially impermeable to a pressurized fluid contained by bladder 40*b*. The pressurized fluid contained by bladder 40*b* induces an outward force upon barrier 50*b* and tends to separate or otherwise press outward upon first barrier layer 51*b* and second barrier layer 52*b*. Tensile member 60*b*, however, is bonded to each of first barrier layer 51*b* and second barrier layer 52*b* and is placed in tension by the pressurized fluid, thereby restraining outward movement of barrier 50*b*.

First barrier layer 51*b* and second barrier layer 52*b* are bonded together around their respective peripheries to form a peripheral bond 53*b* and cooperatively form a sealed chamber, in which tensile member 60*b* and the pressurized fluid are located. Suitable materials for barrier 50*b* include any of the materials discussed above with respect to barrier 50. Tensile member 60*b* is a polymer foam member that is bonded to barrier 50*b*. Although adhesive bonding may be utilized to secure barrier 50*b* and tensile member 60*b*, direct bonding may also be suitable when both barrier 50*b* and tensile member 60*b* are formed from thermoplastic polymers. Accordingly, the polymer foam material of tensile member 60*b* may be the thermoplastic polyurethane foam manufactured by Huntsman International, L.L.C. under the SMARTLITE trademark, or may also be the material produced through the process developed by Trexel, Incorporated and marketed under the MUCELL trademark. Other suitable foams, whether thermoplastic or thermoset, may be utilized for tensile member 60*b*.

Tensile member 60, as discussed above, has a configuration wherein the surfaces bonded to barrier 50 are both planar and parallel. In contrast, tensile member 60*b* includes an upper surface with a concave configuration, and tensile member 60*b* includes a lower surface that is generally planar. The concave configuration of the upper surface provides bladder 40*b* with a concave upper area that joins with upper 20 and forms a depression for securely receiving the heel of the wearer. Similarly, the planar lower surface provides bladder 40*b* with a generally planar configuration that joins with outsole 32*b* and forms a surface for contacting the ground. The various contours for the surfaces of tensile member 60*b* may vary significantly from the configuration discussed above. For example, the lower surface may incorporate a bevel in the rear-lateral corner of footwear 10, or both surfaces may be planar.

Whereas tensile member 60 extends continuously between opposite sides of barrier 50, tensile member 60*b* includes a plurality of intersecting channels 61*b* and 62*b* that extend through the polymer foam material. Channels 61*b* extend longitudinally from a front portion of tensile member 60*b* to a back portion of tensile member 60*b*. Similarly, channels 62*b* extend laterally between the sides of tensile member 60*b*. Channels 61*b* and 62*b* increase the compressibility of tensile member 60*b* and decrease the overall weight of bladder 40*b*. Although tensile member 60*b* is depicted as having four channels 61*b* and six channels 62*b*, any number of channels 61*b* and 62*b* are contemplated to fall within the scope of the present invention. In addition, channels 61*b* and 62*b* may extend only partially through tensile member 60*b*, rather than extending entirely through tensile member 60*b*.

Channels 61*b* and 62*b* remove portions of tensile member 60*b* and form a plurality of columns 63*b* that extend between upper and lower portions of tensile member 60*b*. The dimensions of columns 63*b* may vary significantly depending upon the quantity and dimensions of channels 61*b* and 62*b*. The dimensions of columns 63*b* have an effect upon the compressibility of bladder 40*b*, and one skilled in the relevant art may, therefore, balance various factors such as the pressure of the fluid and the dimensions of columns 63*b* to modify or otherwise select a suitable compressibility. Other factors that may affect the compressibility of bladder 40*b* include the density of the polymer foam material and the thickness of bladder 40*b*. The pressurized fluid within bladder 40*b* places tensile member 60*b* in tension. Although upper and lower portions of tensile member 60*b* are in tension, a majority of the tension is induced in columns 63*b*. The tension tends to stretch or otherwise elongate columns 63*b*. Accordingly, the dimensions of columns 63*b* may also be selected to limit the degree of elongation in columns 63*b*.

Figure 14:
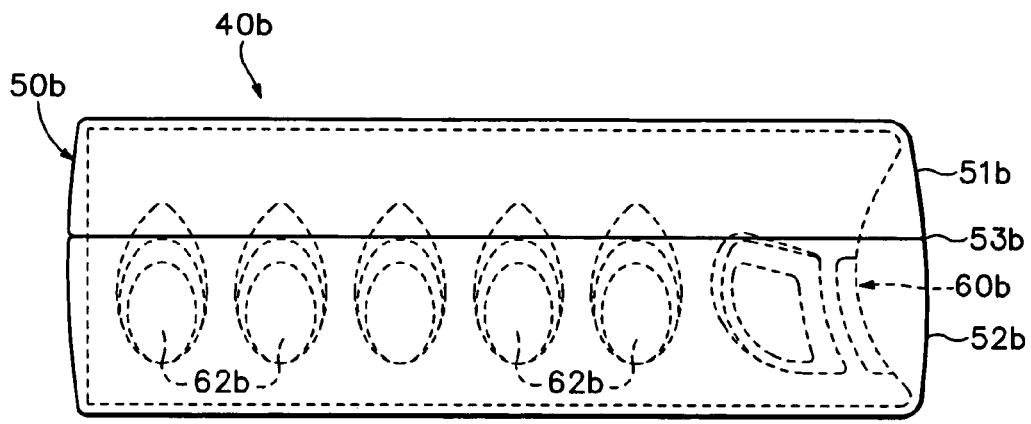
FIG. 14 is a side elevational view of the third bladder.
Figure 15:
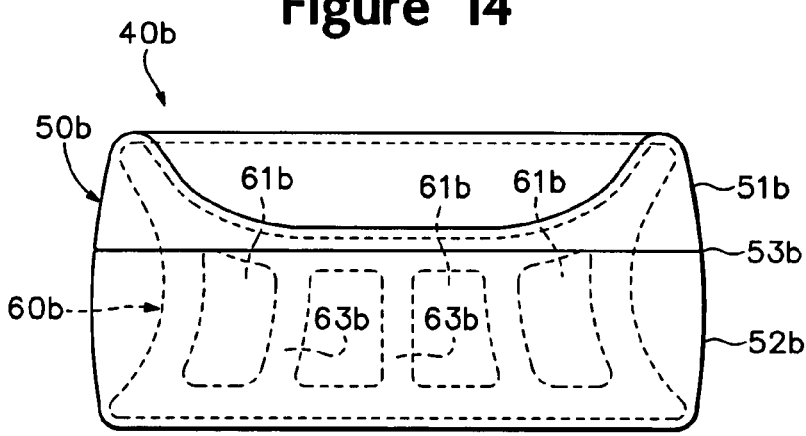
FIG. 15 is a front elevational view of the third bladder.
Figure 16:
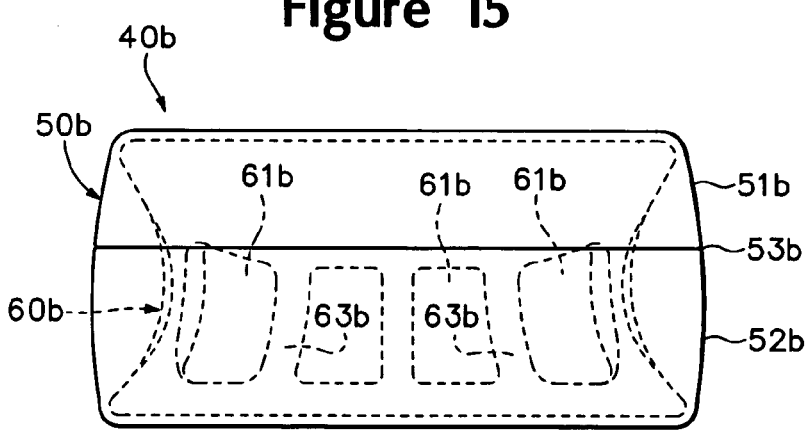
FIG. 16 is a back elevational view of the third bladder.
Figure 18A:
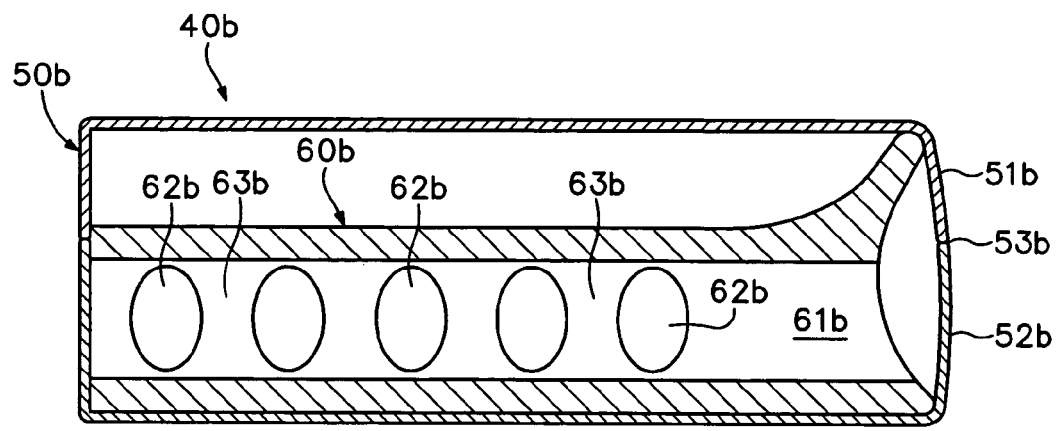
FIG. 18A is a first cross-sectional view of the third bladder, as defined along section line 18A—18A in FIG. 17.
Figure 18B:
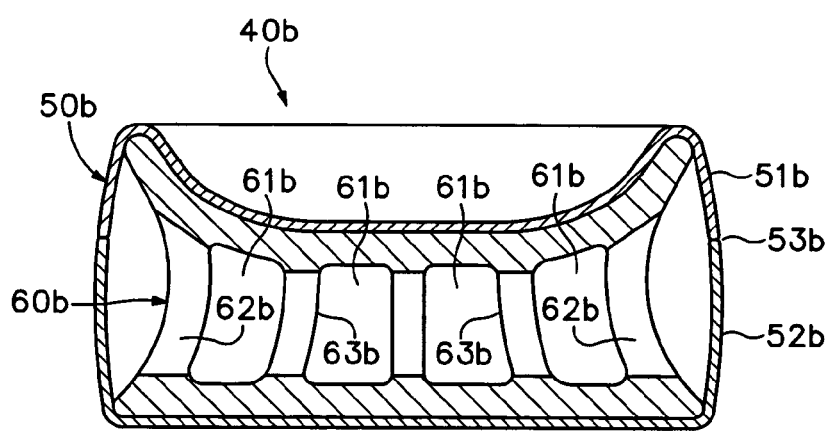
FIG. 18B is a second cross-sectional view of the third bladder, as defined along section line 18B—18B in FIG. 17.
Figure 19:
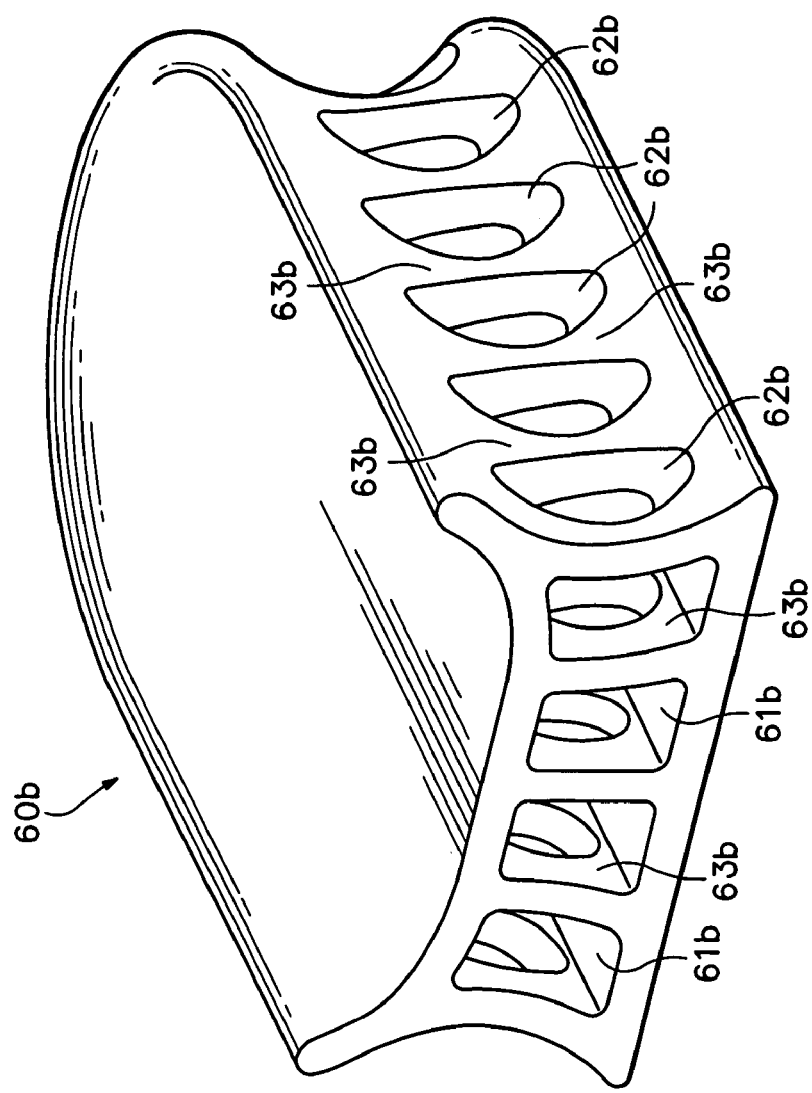
FIG. 19 is a perspective view of a tensile member portion of the third bladder.
Figure 20:
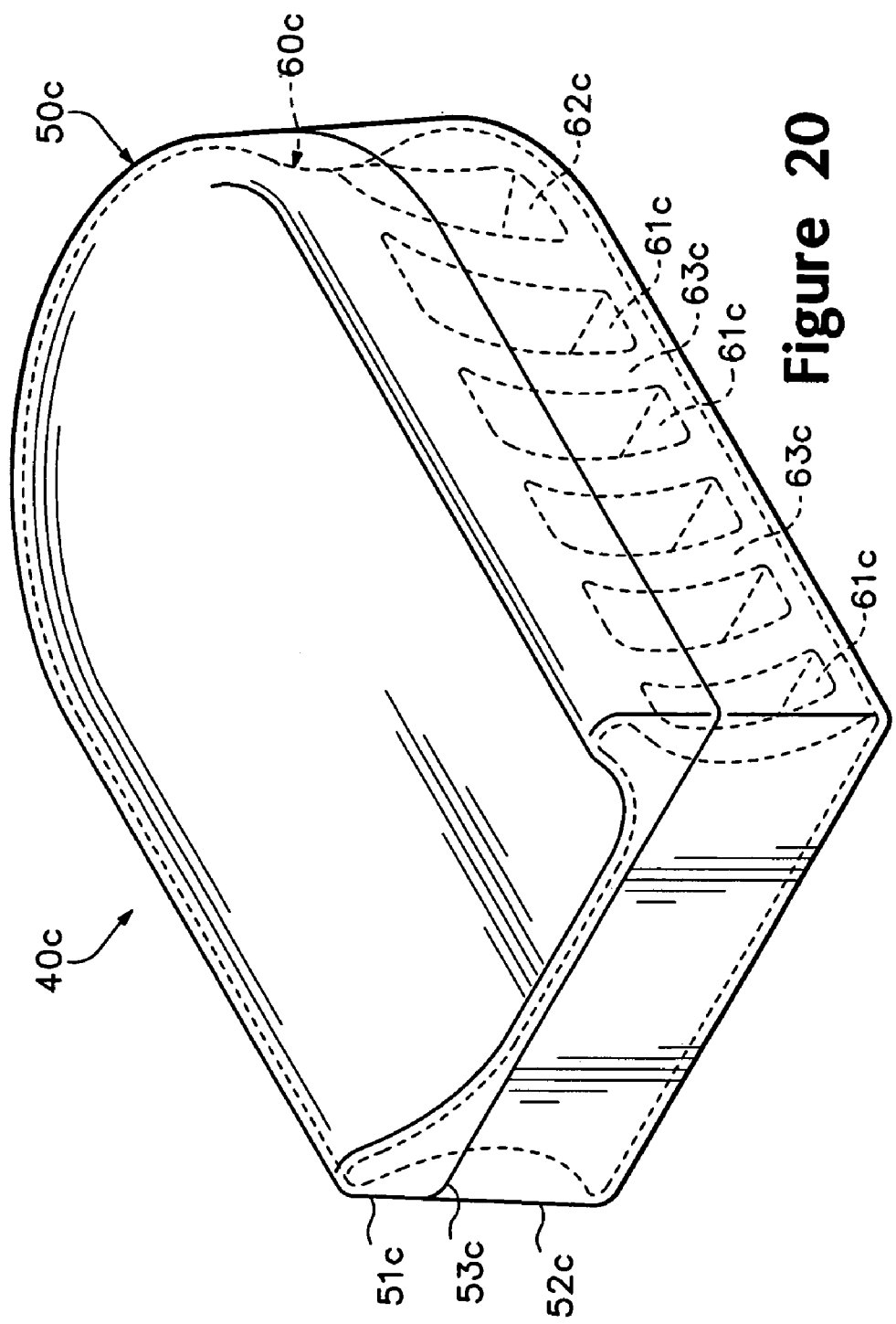
FIG. 20 is a perspective view of a fourth bladder in accordance with the present invention.

Channels 61*b* extend entirely along the longitudinal length of tensile member 40*b* and exhibit a shape that is generally rectangular, as depicted in FIGS. 15 and 16. Similarly, channels 62*b* extend entirely through the lateral width of tensile member 60*b* and exhibit a shape that is generally oval, as depicted in FIG. 14. Although these are suitable shapes for channels 61*b* and 62*b*, the shapes of channels 61*b* and 62*b* may vary to include circular, triangular, hexagonal, or other regular or non-regular configurations. Channels 61*b* and 62*b* are also depicted as having a constant shape through the length and width of tensile member 60*b*, but may have a non-constant, varying shape or varying dimensions. Accordingly, the configurations of channels 61*b* and 62*b* may vary to impart different compressibilities or properties to different portions of tensile member 60*b*. For example, channels 61*b* and 62*b* may have greater dimensions in the rear-lateral portion of tensile member 60*b* in order to decrease the overall compressibility of sole structure 30*b* in the rear-lateral corner.

The upper and lower surfaces of tensile member 60b are bonded to barrier 50b. The side surfaces of tensile member 60b may, however, remain unbonded to barrier 50b. The sidewalls of bladder 40b may bulge or otherwise protrude outward due to the pressure of the fluid within bladder 40b. In some embodiments, the side surfaces of tensile member 60b may be entirely or partially bonded to barrier 50b.

Tensile member 60b may be formed through an injection molding process wherein the polymer foam is injected into a mold having a void with the general shape of tensile member 60b. Various removable rods may extend through the void in locations that correspond with the positions of channels 61b and 62b. Upon at least partial curing of the polymer foam, the rods may be removed and the mold may be opened to permit removal of tensile member 60b.

With reference to FIGS. 20–23, another bladder 40c is depicted as including an outer barrier 50c and a tensile member 60c. As with the prior embodiments, barrier 50c includes a first barrier layer 51c and a second barrier layer 52c that are substantially impermeable to a pressurized fluid contained by bladder 40c. The pressurized fluid contained by bladder 40c induces an outward force upon barrier 50c and tends to separate or otherwise press outward upon first barrier layer 51c and second barrier layer 52c. Tensile member 60c, however, is bonded to each of first barrier layer 51c and second barrier layer 52c and is placed in tension by the pressurized fluid, thereby restraining outward movement of barrier 50c.

First barrier layer 51c and second barrier layer 52c are bonded together around their respective peripheries to form a peripheral bond 53c and cooperatively form a sealed chamber, in which tensile member 60c and the pressurized fluid are located. Suitable materials for barrier 50c include any of the materials discussed above with respect to barrier 50. Tensile member 60c is a polymer foam member that is bonded to barrier 50c. Although adhesive bonding may be utilized to secure barrier 50c and tensile member 60c, direct bonding may also be suitable when both barrier 50c and tensile member 60c are formed from thermoplastic polymers. Accordingly, the polymer foam material of tensile member 60c may be the thermoplastic polyurethane foam manufactured by Huntsman International, L.L.C. under the SMARTLITE trademark, or may also be the material produced through the process developed by Trexel, Incorporated and marketed under the MUCELL trademark. Other suitable foams, whether thermoplastic or thermoset, may be utilized for tensile member 60c.

Tensile member 60c includes an upper surface with a concave configuration, and tensile member 60c includes a lower surface that is generally planar. The concave configuration of the upper surface provides bladder 40c with a concave upper area that joins with an upper and forms a depression for securely receiving the heel of the wearer. Similarly, the planar lower surface provides bladder 40c with a generally planar configuration that joins with an outsole and forms a surface for contacting the ground. The various contours for the surfaces of tensile member 60c may, however, vary significantly from the configuration discussed above.

Tensile member 60c includes a plurality of channels 61c and 62c that extend through or at least partially into the polymer foam material and form columns 63c that extend between upper and lower portions of tensile member 60c. Channels 61c extend laterally between the sides of tensile member 60c. Channels 62c extend into the polymer foam material in the rear portion and form a radial configuration. That is, channels 62c extend into the polymer foam material around the semi-circular rear portion of tensile member 60c, and channels 62c intersect the rear-most channel 61c. In contrast with tensile member 60b, tensile member 60c is not depicted as having channels that extend longitudinally, but may have longitudinal channels in further embodiments. Channels 61c and 62c increase the compressibility of tensile member 60c and decrease the overall weight of bladder 40c.

Figure 21:
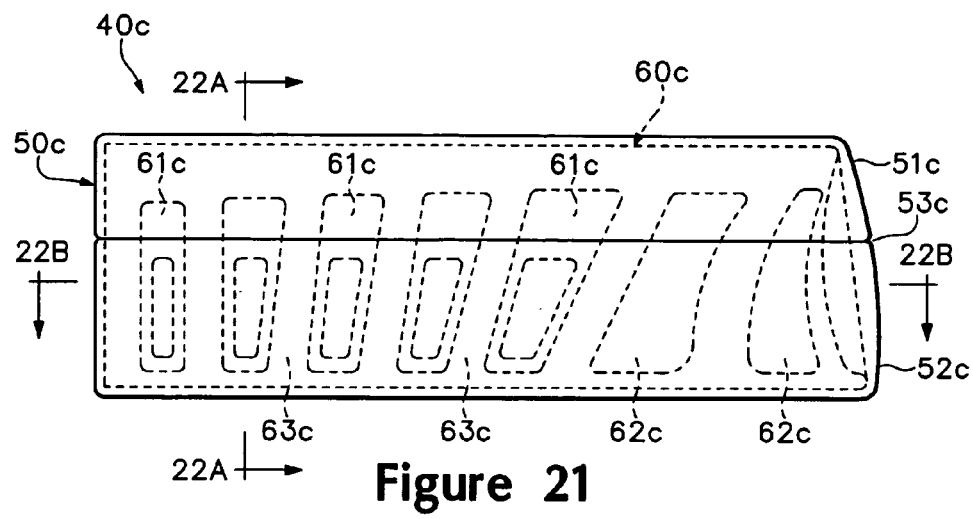
FIG. 21 is a side elevational view of the fourth bladder.
Figure 22A:
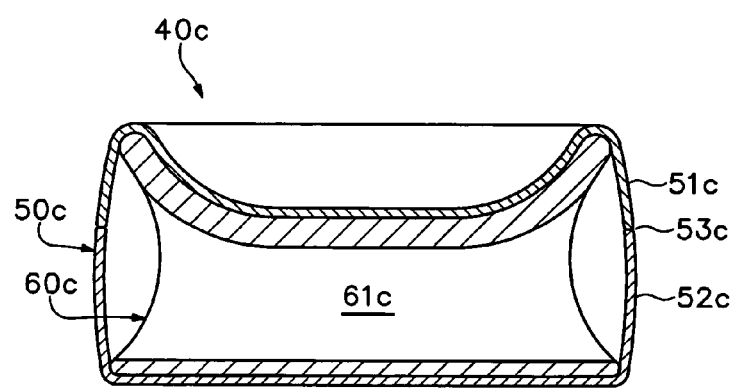
FIG. 22A is a first cross-sectional view of the fourth bladder, as defined along section line 22A—22A in FIG. 21.
Figure 22B:
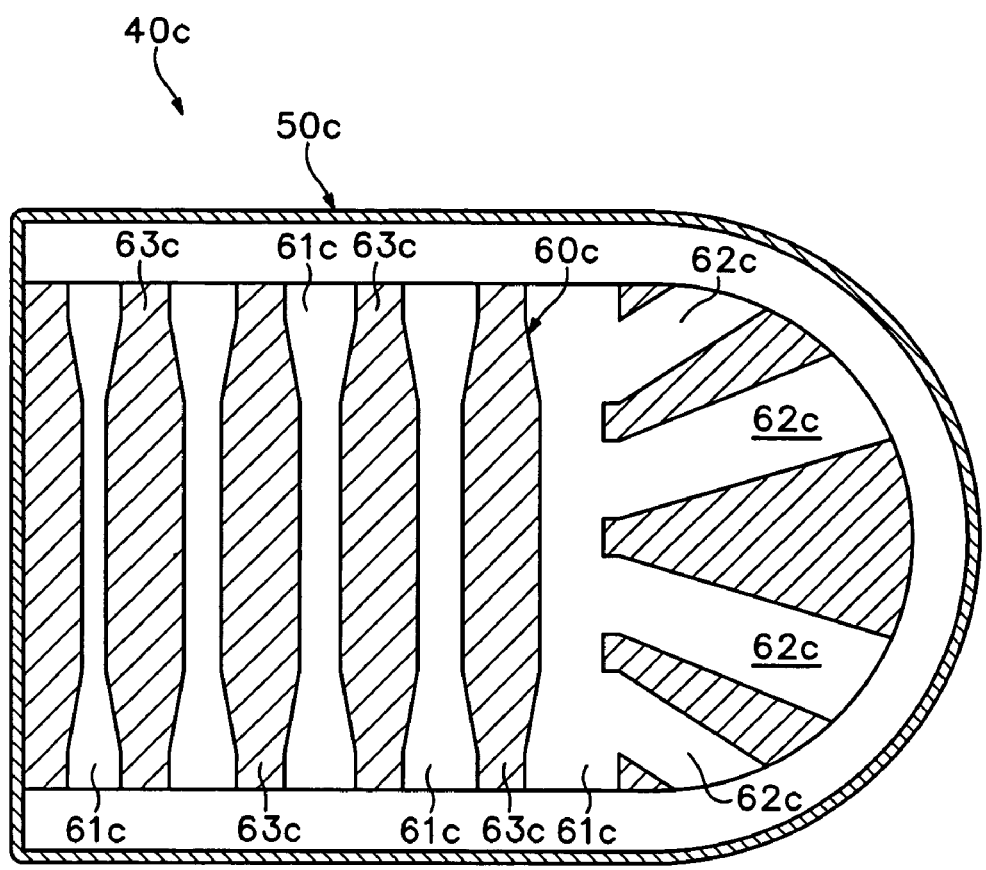
FIG. 22B is a second cross-sectional view of the fourth bladder, as defined along section line 22B—22B in FIG. 21.
Figure 24:
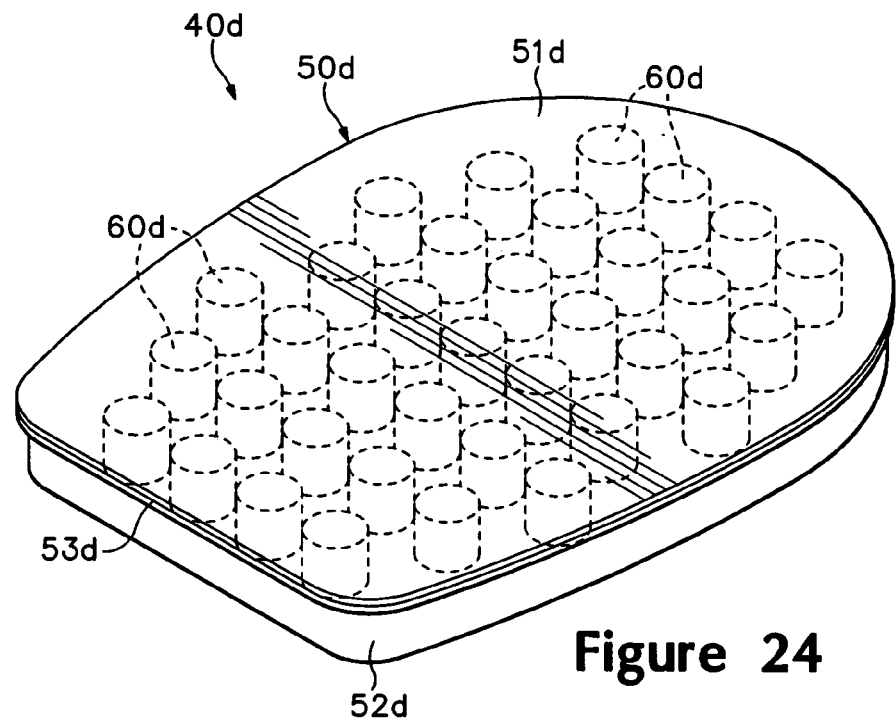
FIG. 24 is a perspective view of a fifth bladder in accordance with the present invention.
Figure 25:
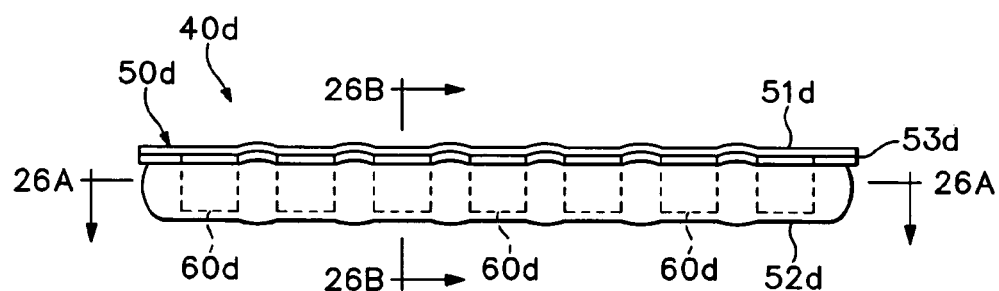
FIG. 25 is a side elevational view of the of the fifth bladder.
Figure 26A:
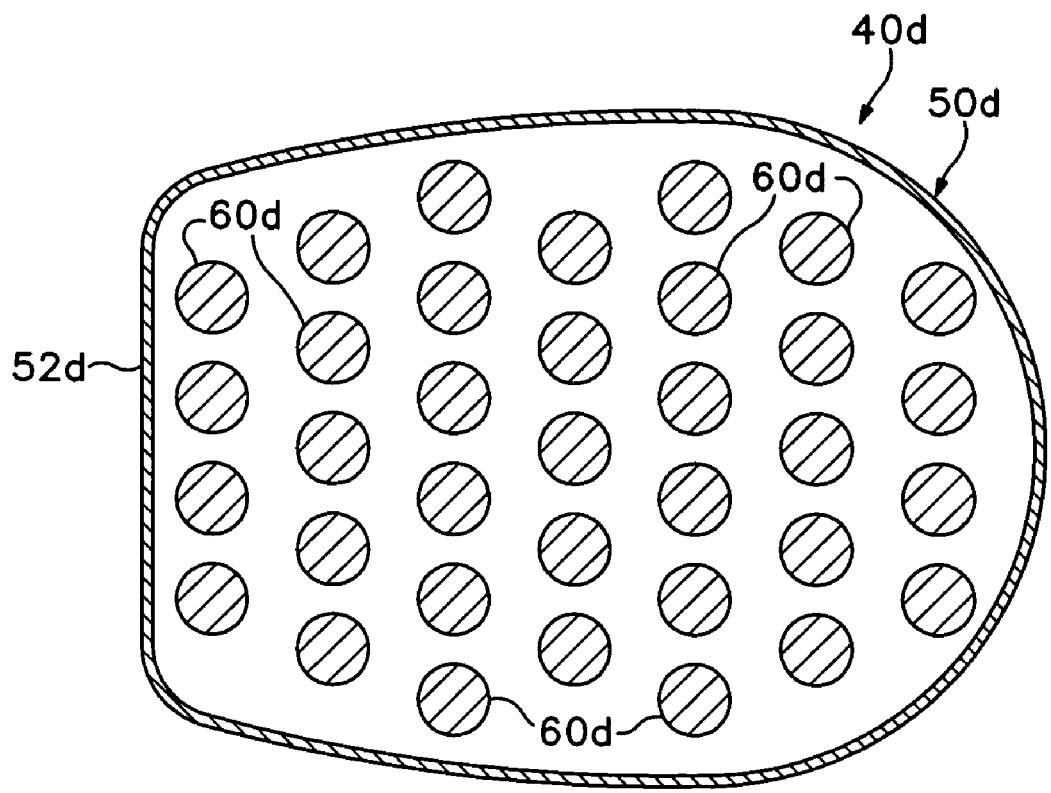
FIG. 26A is a first cross-sectional view of the fifth bladder, as defined along section line 26A—26A in FIG. 25.
Figure 26B:
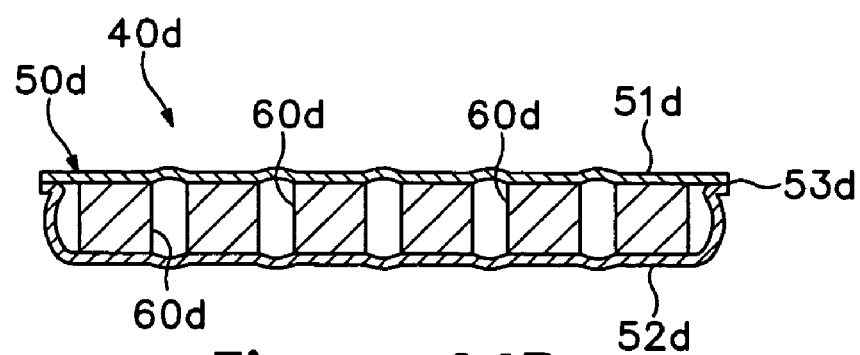
FIG. 26B is a second cross-sectional view of the fifth bladder, as defined along section line 26B—26B in FIG. 25.
Figure 27:
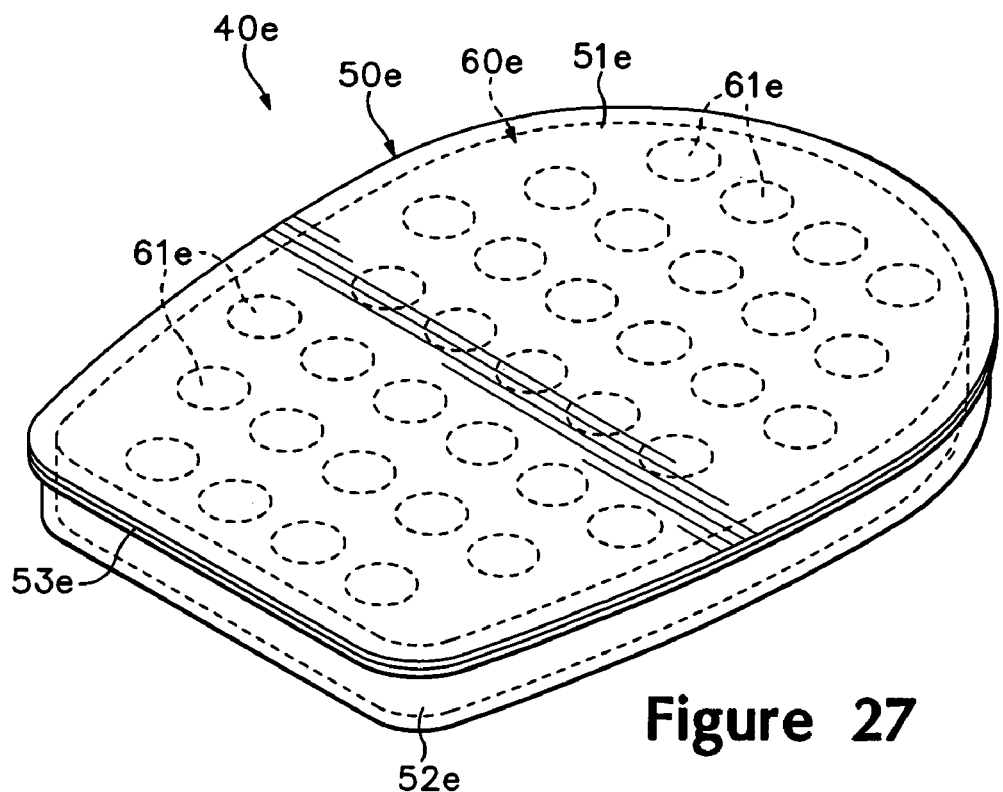
FIG. 27 is a perspective view of a sixth bladder in accordance with the present invention.
Figure 28:
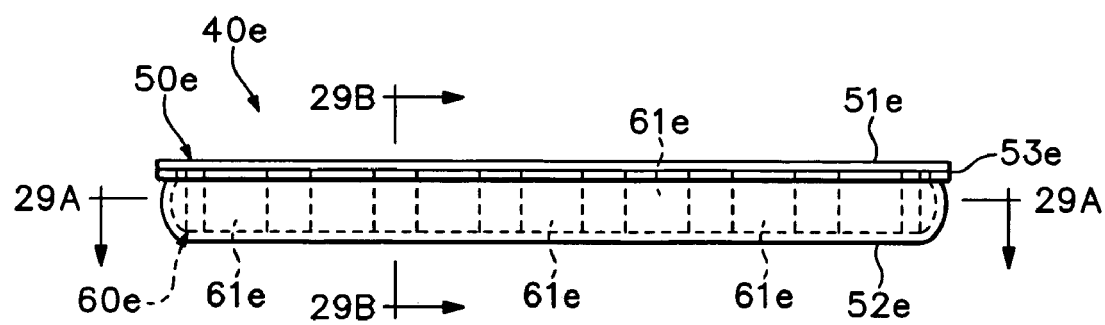
FIG. 28 is a side elevational view of the of the sixth bladder.
Figure 29A:
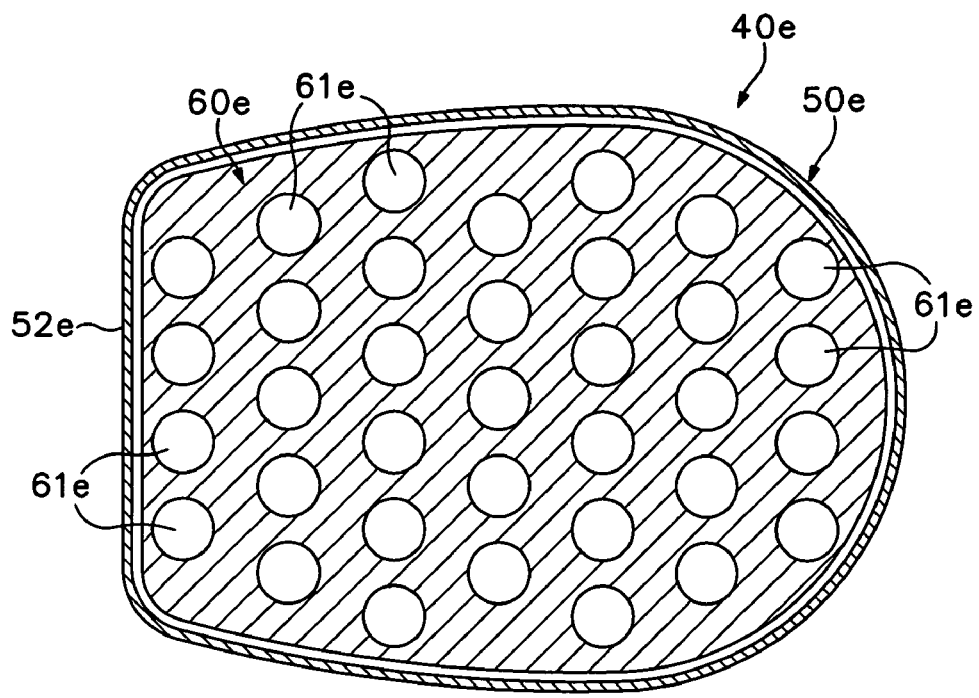
FIG. 29A is a first cross-sectional view of the sixth bladder, as defined along section line 29A—29A in FIG. 28.
Figure 29B:
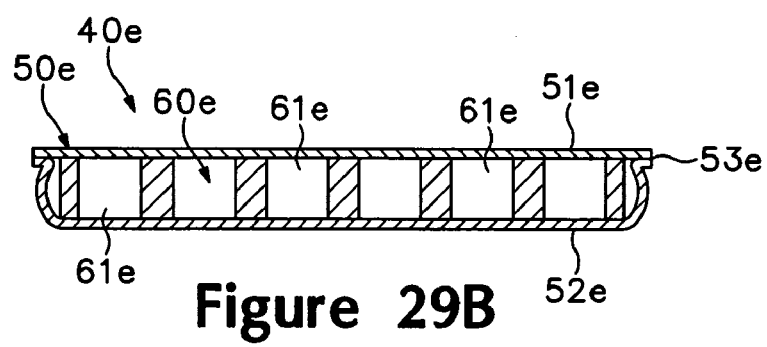
FIG. 29B is a second cross-sectional view of the sixth bladder, as defined along section line 29B—29B in FIG. 28.

Channels 61c and 62c are configured to selectively increase or vary the compressibility of tensile member 60c in different areas. Referring to FIG. 21, the channel 61c in a front area of tensile member 60c is vertically-oriented. Subsequent channels 61c, however, become increasingly diagonal or otherwise non-vertical as channels 61c extend rearward. In addition, the various columns 63c also tend to become more non-vertical in the rear area than in the front area. In compression, vertical columns 63c will generally provide greater support than non-vertical or diagonal columns 63c. Accordingly, the orientation of channels 63c may be utilized to affect or otherwise configure the compressibility of bladder 40c in various areas. Furthermore, channels 62c may also exhibit a non-vertical orientation to further increase the compressibility of bladder 40c in the rear area.

The upper and lower surfaces of tensile member 60c are bonded to barrier 50c. The side surfaces of tensile member 60c may, however, remain unbonded to barrier 50c. The sidewalls of bladder 40c may bulge or otherwise protrude outward due to the pressure of the fluid within bladder 40c. In some embodiments, the side surfaces of tensile member 60c may be entirely or partially bonded to barrier 50c.

With reference to FIGS. 24–26B, a bladder 40d is depicted as including an outer barrier 50d and a plurality of tensile members 60d. Barrier 50d includes a first barrier layer 51d and a second barrier layer 52d that are substantially impermeable to a pressurized fluid contained by bladder 40d. First barrier layer 51d and second barrier layer 52d are bonded together around their respective peripheries to form a peripheral bond 53d and cooperatively form a sealed chamber, in which tensile members 60d and the pressurized fluid are located.

Tensile members 60d are a plurality of discrete foam members, which may have the configuration of columns, that are bonded to each of first barrier layer 51d and second barrier layer 52d. Tensile member 60d are depicted as having generally uniform dimensions, but may have different dimensions, such as height and thickness, within the scope of the present invention. The upper and lower surface of tensile members 60d are generally planar and parallel, but may also be contoured to provide a shape to bladder 40d.

The pressurized fluid contained by bladder 40d induces an outward force upon barrier 50d and tends to separate or otherwise press outward upon first barrier layer 51d and second barrier layer 52d. Tensile members 60d are each placed in tension by the fluid and retain the generally flat configuration of bladder 40d that is depicted in the figures. As with bladder 40, direct bonding may be an effective manner of securing barrier 50d and tensile members 60d.

A bladder 40e is depicted in FIGS. 27–29A and has the general configuration of bladder 40, as discussed above. Accordingly, bladder 40e includes an outer barrier 50e and a tensile member 60e. Barrier 50e includes a first barrier layer 51e and a second barrier layer 52e that are substantially impermeable to a pressurized fluid contained by bladder 40e. First barrier layer 51e and second barrier layer 52e are bonded together around their respective peripheries to form a peripheral bond 53e and cooperatively form a sealed chamber, in which tensile member 60e and the pressurized fluid are located.

Tensile member 60e is a foam member that is bonded to each of first barrier layer 51e and second barrier layer 52e. The upper and lower surface of tensile member 60e are generally planar and parallel, but may also be contoured. In contrast with bladder 40, and more particularly tensile member 60, tensile member 60e defines a plurality of channels 61e that extend vertically through tensile member 60e.

The pressurized fluid contained by bladder 40e induces an outward force upon barrier 50e and tends to separate or otherwise press outward upon first barrier layer 51e and second barrier layer 52e. Tensile member 60e is placed in tension by the fluid and retains the generally flat configuration of bladder 40e that is depicted in the figures. As with bladder 40, direct bonding may be an effective manner of securing barrier 50e and tensile member 60e.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. A bladder comprising:
a sealed barrier defining an interior volume and formed of a polymer sheet material, the barrier having:
a first portion that forms a first surface of the bladder, the first surface having a concave configuration,
a second portion that forms an opposite second surface of the bladder, the second surface having a substantially planar configuration, and
a sidewall portion that that extends between the first portion and the second portion to form a sidewall of the bladder;
a tensile member located within the interior volume and bonded to the first portion and the second portion of the barrier, the tensile member being formed of a polymer foam material; and
a fluid located within the interior volume, the fluid being pressurized to place an outward force upon the barrier and induce tension in at least a portion of the tensile member.

2. The bladder recited in claim 1, wherein a surface of the tensile member that is bonded to the first portion of the barrier has a concave area.

3. The bladder recited in claim 1, wherein substantially all of the first portion and the second portion of the barrier are bonded to the tensile member.

4. The bladder recited in claim 3, wherein the sidewall portion of the barrier is substantially unbonded to the tensile member.

5. The bladder recited in claim 1, wherein at least a portion of a surface of the tensile member that is adjacent the sidewall portion of the barrier is spaced from the sidewall portion of the barrier.

6. The bladder recited in claim 5, wherein the surface of the tensile member that is adjacent the sidewall portion of the barrier has a concave configuration.

7. The bladder recited in claim 1, wherein surface of the tensile member that arc adjacent the first portion and the sidewall portion of the barrier have concave configurations.

8. The bladder recited in claim 1, wherein the tensile member has:
a first layer that is bonded to substantially all of the first portion of the barrier;
a second layer that is bonded to substantially all of the second portion of the barrier; and
a plurality of columns that extend between the first layer and the second layer.

9. The bladder recited in claim 8, wherein the first layer of the tensile member has a concave configuration.

10. The bladder recited in claim 1, wherein the tensile member and the barrier are directly bonded to each other.

11. The bladder recited in claim 1, wherein the polymer sheet material and the polymer form material arc polyurethane materials.

12. The bladder recited in claim 1, wherein the tensile member has a first section and a second section, a density of the first section being greater than a density of the second section.

13. The bladder recited in claim 1, wherein the tensile member defines a plurality of channels extending into the polymer foam material.

14. The bladder recited in claim 13, wherein the channels extend through the tensile member.

15. The bladder recited in claim 13, wherein a first channel is substantially perpendicular to a second channel.

16. The bladder recited in claim 15, wherein the first channel and the second channel intersect.

17. An article of footwear having an upper and a sole structure secured to the upper, the sole structure including a bladder comprising:
a sealed barrier defining an interior volume and formed of a polymer sheet material, the barrier having:
a first portion that forms a first suite of the bladder,
a second portion that forms an opposite second surface of the bladder, and
a sidewall portion that that extends between the first portion and the second portion to form a sidewall of the bladder;
a tensile member located within the interior volume and bonded to the first portion and the second portion of the barrier, the tensile member being formed of a polymer foam material; and
a fluid located within the interior volume, the fluid being pressurized to place an outward force upon the barrier and induce tension in at least a portion of the tensile member,
wherein the upper is secured to the first surface of the bladder, and an outsole of the sole structure is secured to the second surface of the bladder.

18. The article of footwear recited in claim 17, wherein at least one of the first surface and the second surface are non-planar.

19. The article of footwear recited in claim 17, wherein the first surface has a concave configuration.

20. The article of footwear recited in claim 19, wherein a surface of the tensile member that is bonded to the first portion of the barrier has a concave area.

21. The article of footwear recited in claim 19, wherein the second surface has a substantially planar configuration.

22. The article of footwear recited in claim 17, wherein substantially all of the first portion and the second portion of the barrier are bonded to the tensile member.

23. The article of footwear recited in claim 22, wherein the sidewall portion of the barrier is substantially unbonded to the tensile member.

24. The article of footwear recited in claim 17, wherein at least a portion of a surface of the tensile member that is adjacent the sidewall portion of the barrier is spaced from the sidewall portion of the barrier.

25. The article of footwear recited in claim 24, wherein the surface of the tensile member that is adjacent the sidewall portion of the barrier has a concave configuration.

26. The article of footwear recited in claim 17, wherein surface of the tensile member that are adjacent the first portion and the sidewall portion of the barrier have concave configurations.

27. The article of footwear recited in claim 17, wherein the tensile member has:
   a first layer that is bonded to substantially all of the first portion of the barrier;
   a second layer that is bonded to substantially all of the second portion of the barrier; and
   a plurality of columns that extend between the first layer and the second layer.

28. The article of footwear recited in claim 27, wherein the first layer of the tensile member has a concave configuration.

29. The article of footwear recited in claim 17, wherein the tensile member and the barrier are directly bonded to each other.

30. The article of footwear recited in claim 17, wherein the polymer sheet material and the polymer foam material are polyurethane materials.

31. The article of footwear recited in claim 17, wherein the tensile member has a first section and a second section, a density of the first section being greater than a density of the second section.

32. The article of footwear recited in claim 17, wherein the tensile member defines a plurality of channels extending into the polymer form material.

33. The article of footwear recited in claim 32, wherein the channels extend through the tensile member.

34. The article of footwear recited in claim 32, wherein a first channel is substantially perpendicular to a second channel.

35. The article of footwear recited in claim 34, wherein the first channel and the second channel intersect.

36. A bladder comprising:
   a sealed barrier defining an interior volume and formed of a polymer sheet material, the barrier having:
      a first portion that forms a first surface of the bladder,
      a second portion that forms an opposite second surface of the bladder, and
      a sidewall portion that that extends between the first portion and the second portion to form a sidewall of the bladder;
   a tensile member located within the interior volume and bonded to the first portion and the second portion of the barrier, the tensile member having surface with concave configurations that are adjacent the first portion and the sidewall portion of the barrier, and the tensile member being formed of a polymer foam material; and
   a fluid located within the interior volume, the fluid being pressurized to place an outward force upon the barrier and induce tension in at least a portion of the tensile member.

37. The bladder recited in claim 36, wherein substantially all of the first portion and the second portion of the barrier are bonded to the tensile member.

38. The bladder recited in claim 37, wherein the sidewall portion of the barrier is substantially unbonded to the tensile member.

39. The bladder recited in claim 36, wherein at least a portion of a surface of the tensile member that is adjacent the sidewall portion of the barrier is spaced from the sidewall portion of the barrier.

40. The bladder recited in claim 36, wherein the tensile member has:
   a first layer that is bonded to substantially all of the first portion of the barrier;
   a second layer that is bonded to substantially all of the second portion of the barrier; and
   a plurality of columns that extend between the first layer and the second layer.

41. The bladder recited in claim 36, wherein the tensile member and the barrier are directly bonded to each other.

42. The bladder recited in claim 36, wherein the polymer sheet material and the polymer foam material are polyurethane materials.

43. The bladder recited in claim 36, wherein the tensile member bas a first section and a second section, a density of the first section being greater than a density of the second section.

44. A bladder comprising:
   a scaled barrier defining an interior volume and formed of a polymer sheet material, the barrier having:
      a first portion that forms a first surface of the bladder,
      a second portion that forms an opposite second surface of the bladder, and
      a sidewall portion that that extends between the first portion and the second portion to form a sidewall of the bladder;
   a tensile member located within the interior volume and bonded to the first portion and the second portion of the barrier, the tensile member being formed of a polymer foam material, and the tensile member having:
      a first layer that is bonded to substantially all of the first portion of the barrier,
      a second layer that is bonded to substantially all of the second portion of the barrier, and
      a plurality or columns that extend between the first layer and the second layer; and
   a fluid located within the interior volume, the fluid being pressurized to place an outward force upon the barrier and induce tension in at least a portion of the tensile member.

45. The bladder recited in claim 44, wherein at least one of the first surface and the second surface arc non-planar.

46. The bladder recited in claim 44, wherein the sidewall portion of the barrier is substantially unbonded to the tensile member.

47. The bladder recited in claim 44, wherein at least a portion of a surface of the tensile member that is adjacent the sidewall portion of the barrier is spaced from the sidewall portion of the barrier.

48. The bladder recited in claim 47, wherein the surface of the tensile member that is adjacent the sidewall portion of the barrier has a concave configuration.

49. The bladder recited in claim 44, wherein the first layer of the tensile member has a concave configuration.

50. The bladder recited in claim 44, wherein the polymer sheet material and the polymer foam material are polyurethane materials.

51. The bladder recited in claim 44, wherein the tensile member has a first section and a second section, a density of the first section being greater than a density of the second section.

52. The bladder recited in claim 44, wherein the tensile member defines a plurality of channels extending into the polymer foam material.

53. The bladder recited in claim 52, wherein the channels extend through the tensile member.

54. The bladder recited in claim 52, wherein a first channel is substantially perpendicular to a second channel.

55. The bladder recited in claim 54, wherein the first channel and the second channel intersect.

* * * * *